United States Patent
Hatakeyama et al.

(10) Patent No.: US 9,829,234 B2
(45) Date of Patent: Nov. 28, 2017

(54) HEAT PUMP DEVICE, HEAT PUMP SYSTEM, AND METHOD FOR CONTROLLING INVERTER

(75) Inventors: Kazunori Hatakeyama, Tokyo (JP); Syota Kamiya, Tokyo (JP); Kenta Yuasa, Tokyo (JP); Shinya Matsushita, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 776 days.

(21) Appl. No.: 14/347,704

(22) PCT Filed: Sep. 30, 2011

(86) PCT No.: PCT/JP2011/072632
§ 371 (c)(1),
(2), (4) Date: Mar. 27, 2014

(87) PCT Pub. No.: WO2013/046454
PCT Pub. Date: Apr. 4, 2013

(65) Prior Publication Data
US 2014/0223926 A1   Aug. 14, 2014

(51) Int. Cl.
*F25B 1/00* (2006.01)
*H02P 1/46* (2006.01)
(Continued)

(52) U.S. Cl.
CPC ............ *F25B 49/025* (2013.01); *H02H 3/08* (2013.01); *H02M 1/32* (2013.01); *H02P 29/62* (2016.02);
(Continued)

(58) Field of Classification Search
USPC .......................... 62/228.1; 318/722, 729, 798
See application file for complete search history.

(56) References Cited

U.S. PATENT DOCUMENTS 3,633,081 A * 1/1972 Weber .................... H02P 29/40
173/7
4,320,331 A * 3/1982 Plunkett ................. H02P 27/08
318/722
(Continued)

FOREIGN PATENT DOCUMENTS

JP  60-68341 U   5/1985
JP  61-091445 A  5/1986
(Continued)

OTHER PUBLICATIONS

International Search Report of the International Searching Authority dated Dec. 20, 2011 for the corresponding international application No. PCT/JP2011/072632 (with English translation).
(Continued)

*Primary Examiner* — Henry Crenshaw
(74) *Attorney, Agent, or Firm* — Posz Law Group, PLC

(57) ABSTRACT

A heat pump device includes an inverter control unit outputting PWM signals to an inverter; a current detection unit detecting a current value flowing in the inverter and outputting the current value after reducing a current value having a first frequency or higher in detected current value; and a drive-signal stop unit that, when the current value output from the current detection unit is equal to or larger than an interruption level, stops output of PWM signals to the inverter. Particularly, the inverter control unit generates a voltage command value such that the voltage command value becomes a value equal to or larger than a lower limit determined according to the first frequency and generates PWM signals based on generated voltage command value and a carrier signal, thereby causing a voltage output time to the motor to be a predetermined time or longer.

11 Claims, 23 Drawing Sheets

(51) Int. Cl.
  *H02P 1/24* (2006.01)
  *H02P 23/00* (2016.01)
  *F25B 49/02* (2006.01)
  *H02H 3/08* (2006.01)
  *H02M 1/32* (2007.01)
  *H02P 29/62* (2016.01)
  *F25B 13/00* (2006.01)

(52) U.S. Cl.
  CPC ........... *F25B 13/00* (2013.01); *F25B 2500/28* (2013.01); *F25B 2600/024* (2013.01); *F25B 2700/151* (2013.01)

(56) References Cited

U.S. PATENT DOCUMENTS

| | | | | |
|---|---|---|---|---|
| 4,357,655 | A * | 11/1982 | Beck | H02M 7/53875 318/811 |
| 4,689,543 | A * | 8/1987 | Hucker | H02P 27/08 318/798 |
| 4,982,147 | A * | 1/1991 | Lauw | H02P 25/024 318/721 |
| 6,142,741 | A * | 11/2000 | Nishihata | F04B 49/02 361/22 |
| 6,229,278 | B1 * | 5/2001 | Garces | H02M 7/53875 318/801 |
| 2002/0039269 | A1 * | 4/2002 | Kumagai | H02M 1/32 361/93.1 |
| 2003/0076065 | A1 * | 4/2003 | Shafer | B62D 5/0496 318/567 |
| 2005/0210900 | A1 * | 9/2005 | Oomura | B60H 1/3214 62/228.1 |
| 2005/0218858 | A1 * | 10/2005 | Takemori | H02P 8/16 318/685 |
| 2006/0138968 | A1 * | 6/2006 | Bakre | H05B 41/295 315/209 R |
| 2006/0250115 | A1 * | 11/2006 | Johnson | H02J 3/387 322/58 |
| 2007/0158778 | A1 * | 7/2007 | Kitabatake | H01L 21/8213 257/493 |
| 2007/0164007 | A1 * | 7/2007 | Peters | B23K 9/0953 219/130.51 |
| 2012/0096881 | A1 | 4/2012 | Sakanobe et al. | |
| 2012/0111043 | A1 | 5/2012 | Hatakeyama et al. | |
| 2012/0234031 | A1 | 9/2012 | Hatakeyama et al. | |
| 2013/0152609 | A1 | 6/2013 | Hatakeyama | |
| 2013/0180273 | A1 | 7/2013 | Hatakeyama | |
| 2013/0291578 | A1 | 11/2013 | Hatakeyama | |

FOREIGN PATENT DOCUMENTS

| | | |
|---|---|---|
| JP | 61-272555 A | 12/1986 |
| JP | 06-018103 A | 1/1994 |
| JP | 08-226714 A | 9/1996 |
| JP | 11-159467 A | 6/1999 |
| JP | 2003009589 A | 1/2003 |
| JP | 2011-102674 A | 5/2011 |
| WO | 2011/013277 A1 | 2/2011 |
| WO | 2011018863 A1 | 2/2011 |
| WO | 2011/074145 A1 | 6/2011 |

OTHER PUBLICATIONS

Extended European Search Report dated Sep. 9, 2015 issued in the corresponding European patent application No. 11873126.4
Office Action dated Mar. 23, 2015 in the corresponding Australian Patent application No. 2011377665.
Office Action dated Feb. 21, 2017 issued in the corresponding EP patent application No. 11873126.4.
Office Action dated Feb. 4, 2017 issued in the corresponding CN patent application No. 201180073753.X (and partial English translation).

\* cited by examiner

FIG.5

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | −U | 0 | 1 | 1 | 1 | 0 | 0 |
| V4 | +U | 1 | 0 | 0 | 0 | 1 | 1 |
| V5 | −V | 1 | 0 | 1 | 0 | 1 | 0 |
| V6 | −W | 1 | 1 | 0 | 0 | 0 | 1 |
| V7 | 0 | 1 | 1 | 1 | 0 | 0 | 0 |

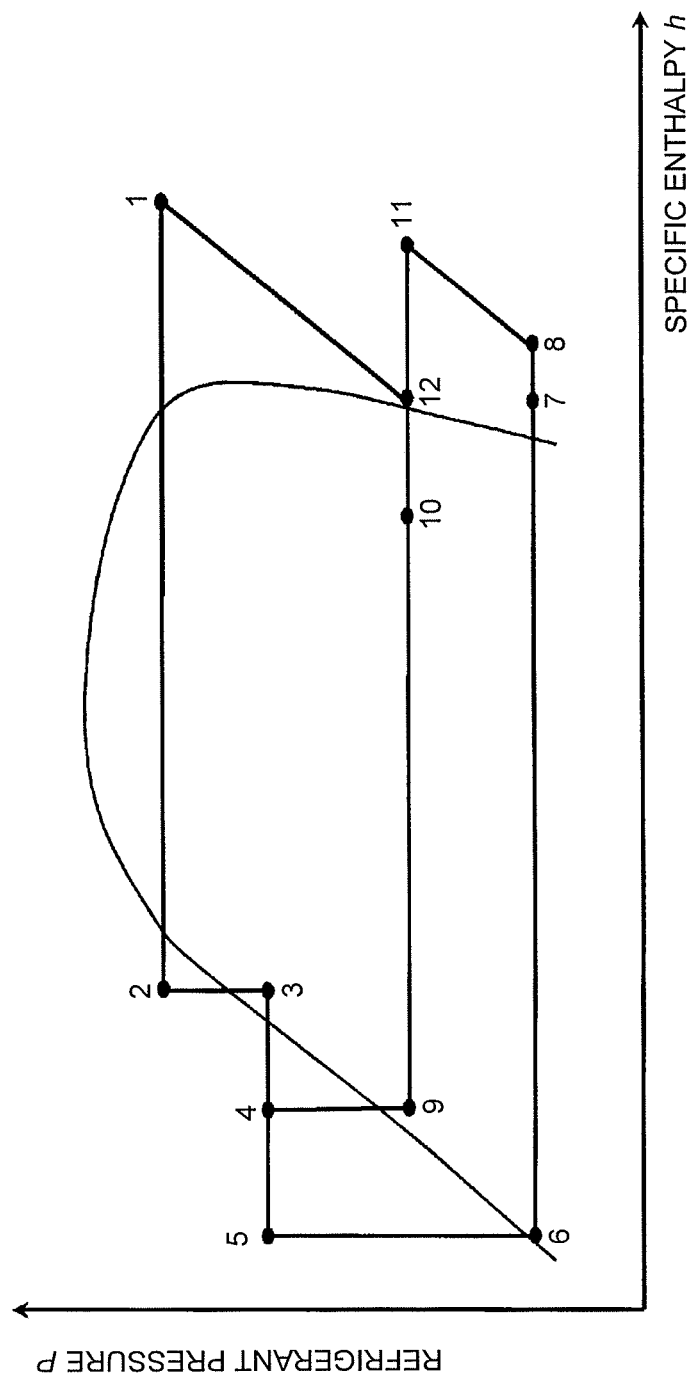

HEAT PUMP DEVICE, HEAT PUMP SYSTEM, AND METHOD FOR CONTROLLING INVERTER

CROSS REFERENCE TO RELATED APPLICATION

This application is a U.S. national stage application of International Patent Application No. PCT/JP2011/072632 filed on Sep. 30, 2011, the disclosure of which is incorporated herein by reference.

TECHNICAL FIELD

The present invention relates to a heating technique for a compressor used in a heat pump device.

BACKGROUND

In Patent Literature 1, there is a description of supplying a high-frequency low voltage to a compressor during a shutdown at the time of heating. In Patent Literature 2, there is a description of supplying a single-phase AC voltage having a higher frequency, e.g., 25 kHz, than that at the time of normal operation to a compressor when the temperature of the air conditioner's surroundings becomes low.

The techniques described in Patent Literatures 1 and 2 are both for facilitating a lubricating action in the compressor by heating the compressor or keeping the compressor warm by applying a high-frequency AC voltage to the compressor in accordance with a decrease in outside air temperature.

PATENT LITERATURE

Patent Literature 1: Japanese Unexamined Utility Model Registration Application Publication No. S60-68341
Patent Literature 2: Japanese Patent Application Laid-Open No. S61-91445

In order to prevent the motor and the inverter from being damaged when a large current flows, it is possible to detect the value of the current flowing in the inverter and to stop applying a voltage from the inverter to the motor in a case where the detected current value is large.

However, when a high-frequency AC voltage is supplied to the compressor, although the value of the current flowing in the inverter is large, because the detected current value has a high frequency, the current may be removed as noise. Consequently, although the value of the current flowing in the inverter is large, voltage application from the inverter to the motor is not stopped; therefore, the motor and the inverter may be damaged.

SUMMARY

An object of the present invention is to prevent the motor and the inverter from being damaged due to the flow of a large current when the compressor is heated by supplying a high-frequency AC voltage to the compressor.

A heat pump device according to the present invention comprises: a compressor including a compression mechanism that compresses a refrigerant; a motor that actuates the compression mechanism of the compressor; an inverter that applies a predetermined voltage to the motor; an inverter control unit that controls the inverter by outputting a drive signal to the inverter; a current detection unit that detects a current value flowing in the inverter and outputs the current value after reducing a current value having a predetermined first frequency or higher in detected current value; and a drive-signal stop unit that, when the current value output from the current detection unit is equal to or larger than a predetermined current value, stops an output of a drive signal from the inverter control unit to the inverter, wherein the inverter control unit comprises a voltage-command generation unit that generates and outputs a voltage command value, a drive-signal generation unit that compares a voltage command value output from the voltage-command generation unit with a value of a reference signal having a predetermined frequency, generates a drive signal on a basis of a comparison result, and outputs generated drive signal to the inverter, and a voltage-command-value control unit that controls a value of a voltage command value such that a voltage command value generated by the voltage-command generation unit becomes a value that is equal to or larger than a lower limit determined according to the first frequency.

In the heat pump device according to the present invention, a voltage command value equal to or higher than the lower limit determined in accordance with a first frequency is generated and a drive signal is generated. Accordingly, the frequency of the current is reduced and therefore the current value is not removed as noise. Thus, it is possible to definitely detect that a large current flows in the inverter and definitely stop the output of a voltage from the inverter to the motor; therefore, the motor and the inverter can be prevented from being damaged.

BRIEF DESCRIPTION OF DRAWINGS

FIG. 5 is a chart showing eight switching patterns in the first embodiment.

FIG. 23 is a Mollier chart of a state of a refrigerant of the heat pump device 100 shown in FIG. 22.

DETAILED DESCRIPTION

First Embodiment

In a first embodiment, a basic configuration and operations of a heat pump device 100 are explained.

Figure 1:
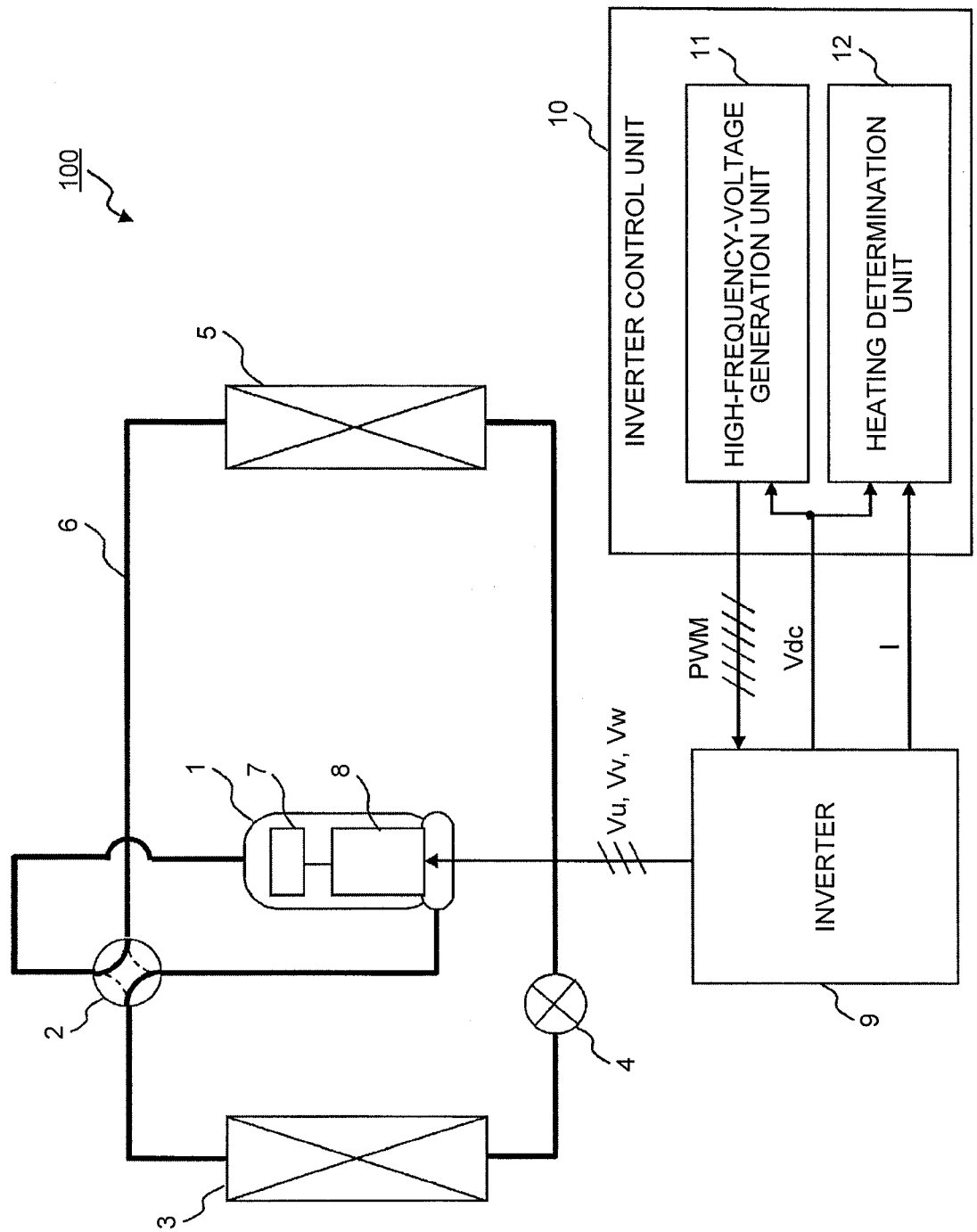
FIG. 1 is a diagram showing a configuration of a heat pump device 100 according to a first embodiment.

FIG. 1 is a diagram showing a configuration of the heat pump device 100 according to the first embodiment.

The heat pump device 100 according to the first embodiment includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7 that compresses a refrigerant and a motor 8 that actuates the compression mechanism 7 are provided in the compressor 1. The motor 8 is a three-phase motor including windings of three phases (U-phase, V-phase, and W-phase).

An inverter 9 that applies a voltage to the motor 8 to drive it is electrically connected to the motor 8. The inverter 9 applies voltages Vu, Vv and Vw to the U-phase, the V-phase and the W-phase windings of the motor 8, respectively.

The inverter 9 is electrically connected with an inverter control unit 10 including a high-frequency-voltage generation unit 11 and a heating determination unit 12 (state detection unit). The inverter control unit 10 determines whether the motor 8 needs to be heated based on a bus voltage Vdc that is a power supply voltage of the inverter 9, transmitted from the inverter 9, and a value of a current I flowing to the motor 8. When the motor 8 needs to be heated, the inverter control unit 10 outputs a PWM (Pulse Width Modulation) signal (drive signal) to the inverter 9.

Figure 2:
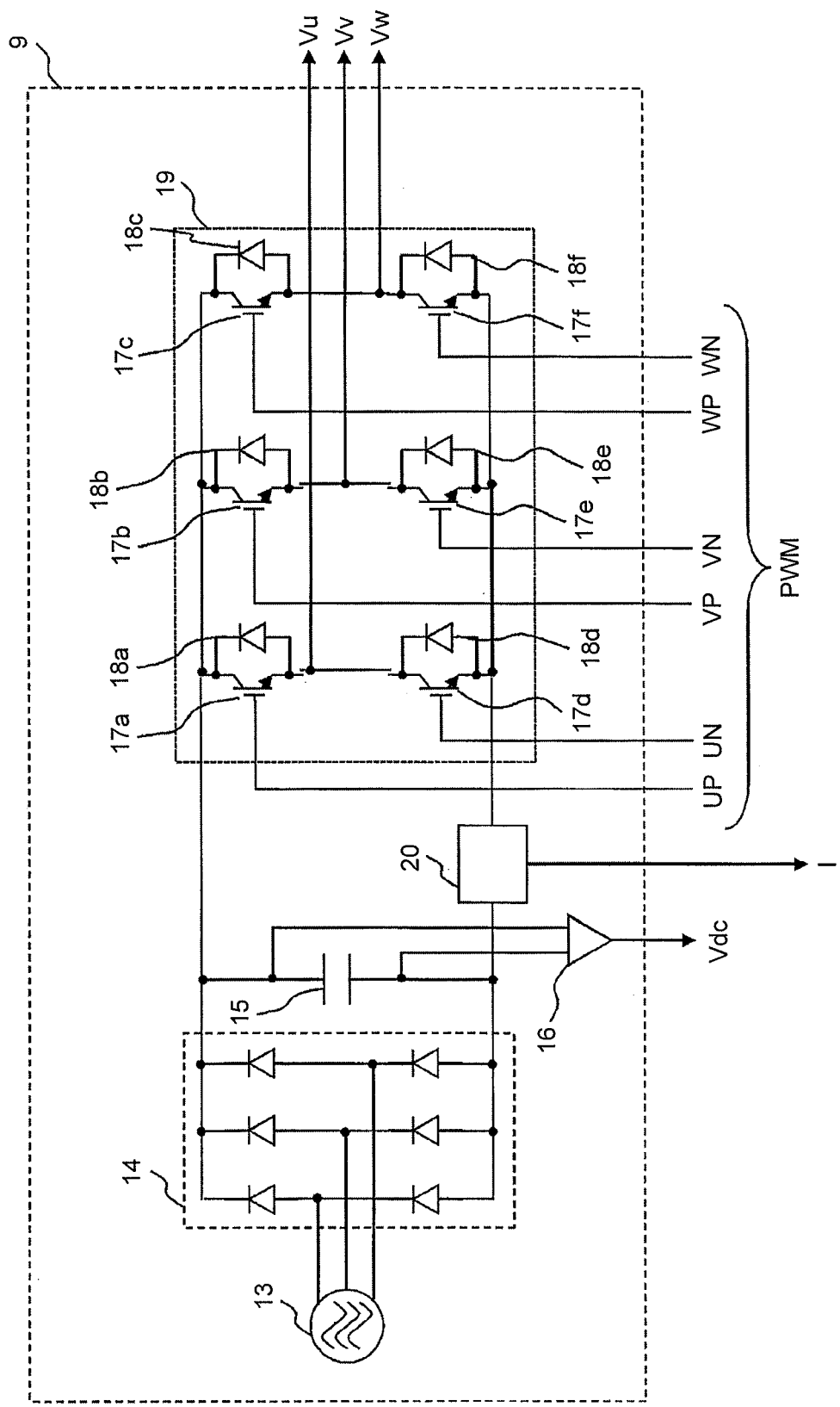
FIG. 2 is a diagram showing a configuration of an inverter 9 according to the first embodiment.

FIG. 2 is a diagram showing a configuration of the inverter 9 according to the first embodiment.

The inverter 9 includes an AC power supply 13, a rectifier 14 that rectifies a voltage supplied from the AC power supply 13, a smoothing capacitor 15 that smoothes the voltage rectified by the rectifier 14 to generate a DC voltage (bus voltage Vdc), and a bus-voltage detection unit 16 that detects the bus voltage Vdc generated by the smoothing capacitor 15 and outputs the bus voltage to the inverter control unit 10.

The inverter 9 includes a voltage application unit 19 using the bus voltage Vdc as a power supply. The voltage application unit 19 is a circuit in which three series connection portions of two switching elements (17a and 17d, 17b and 17e, and 17c and 17f) are connected in parallel, and reflux diodes 18a to 18f that are connected in parallel to the respective switching elements 17a to 17f are provided. The voltage application unit 19 drives the respective switching elements in accordance with PWM signals UP, VP, WP, UN, VN and WN, respectively, transmitted from the inverter control unit 10 (17a driven by UP, 17b driven by VP, 17c driven by WP, 17d driven by UN, 17e driven by VN, and 17f driven by WN). The voltage application unit 19 applies the voltages Vu, Vv and Vw according to the driven switching elements 17 to the U-phase, V-phase and W-phase windings of the motor 8, respectively.

Furthermore, the inverter 9 includes a current detection unit 20 that detects the current I flowing from the inverter 9 to the motor 8 by applying the voltages Vu, Vv and Vw to the U-phase, V-phase and W-phase windings of the motor 8, respectively, to output the current I to the inverter control unit 10.

Figure 3:
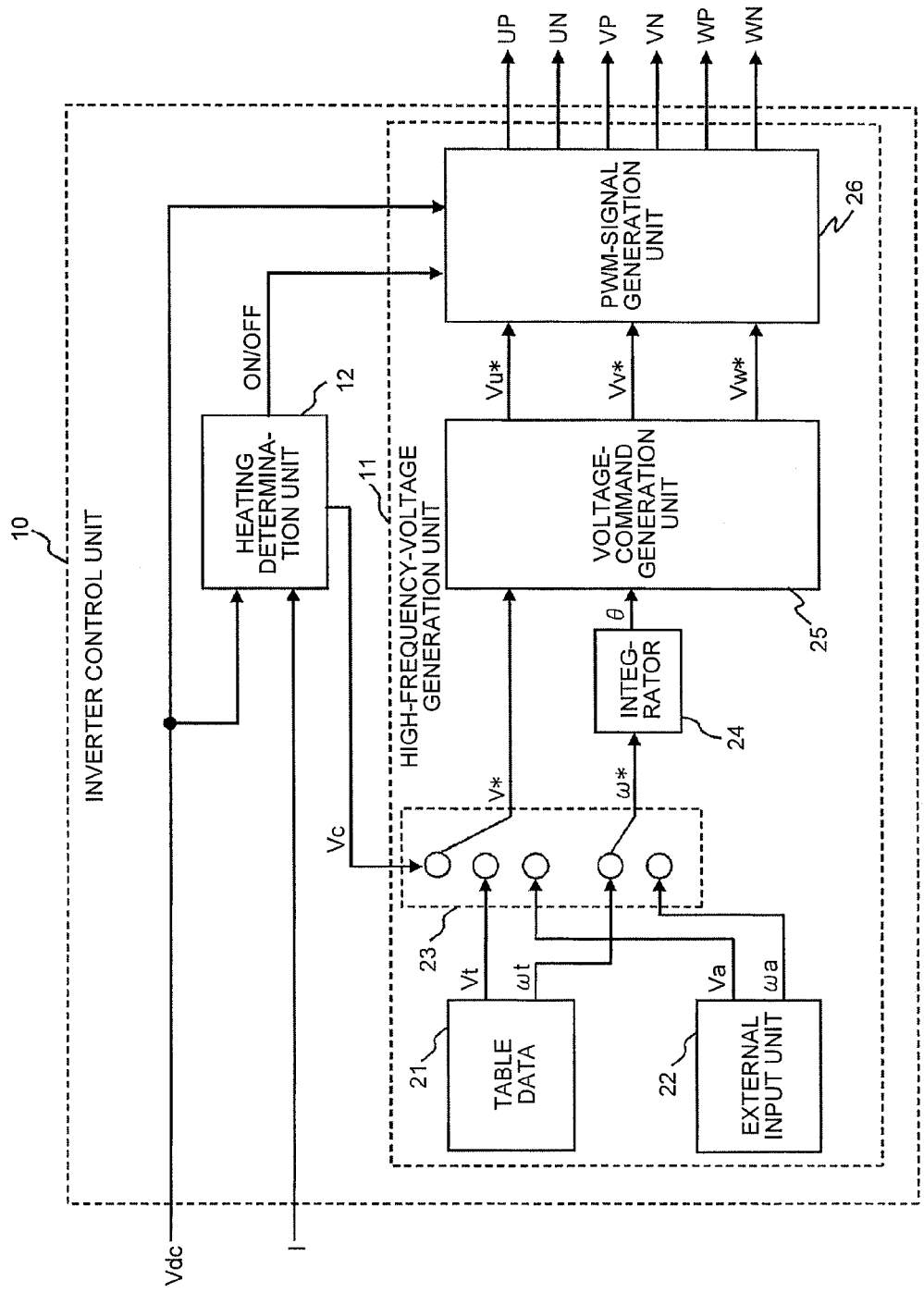
FIG. 3 is a diagram showing a configuration of an inverter control unit 10 according to the first embodiment.

FIG. 3 is a diagram showing a configuration of the inverter control unit 10 according to the first embodiment.

As described above, the inverter control unit 10 includes the high-frequency-voltage generation unit 11 and the heating determination unit 12. The heating determination unit 12 is explained later, and the high-frequency-voltage generation unit 11 is explained here.

The high-frequency-voltage generation unit 11 includes table data 21, an external input unit 22, a selection unit 23, an integrator 24, a voltage-command generation unit 25, and a PWM-signal generation unit 26.

The selection unit 23 selects and outputs any one of a voltage command value Vc outputted from the heating determination unit 12, a voltage command value Vt recorded in the table data 21, and a voltage command value Va inputted from the external input unit 22 as a voltage command value V*. The selection unit 23 also selects and outputs either a rotation-speed command value ωt recorded in the table data 21 or a rotation-speed command value ωa inputted from the external input unit 22 as a rotation-speed command value ω*.

The integrator 24 obtains a voltage phase θ based on the rotation-speed command value ω* outputted by the selection unit 23.

The voltage-command generation unit 25 generates and outputs voltage command values Vu*, Vv* and Vw* using the voltage command value V* outputted by the selection unit 23 and the voltage phase θ obtained by the integrator 24 as inputs thereto.

The PWM-signal generation unit 26 generates the PWM signals (UP, VP, WP, UN, VN and WN) based on the voltage command values Vu*, Vv* and Vw* outputted by the voltage-command generation unit 25 and the bus voltage Vdc, and outputs the PWM signals to the inverter 9.

Now, description is made for a generation method of generating the voltage command values Vu*, Vv* and Vw* in the voltage-command generation unit 25 and a method of generating the PWM signal in the PWM-signal generation unit 26.

Figure 4:
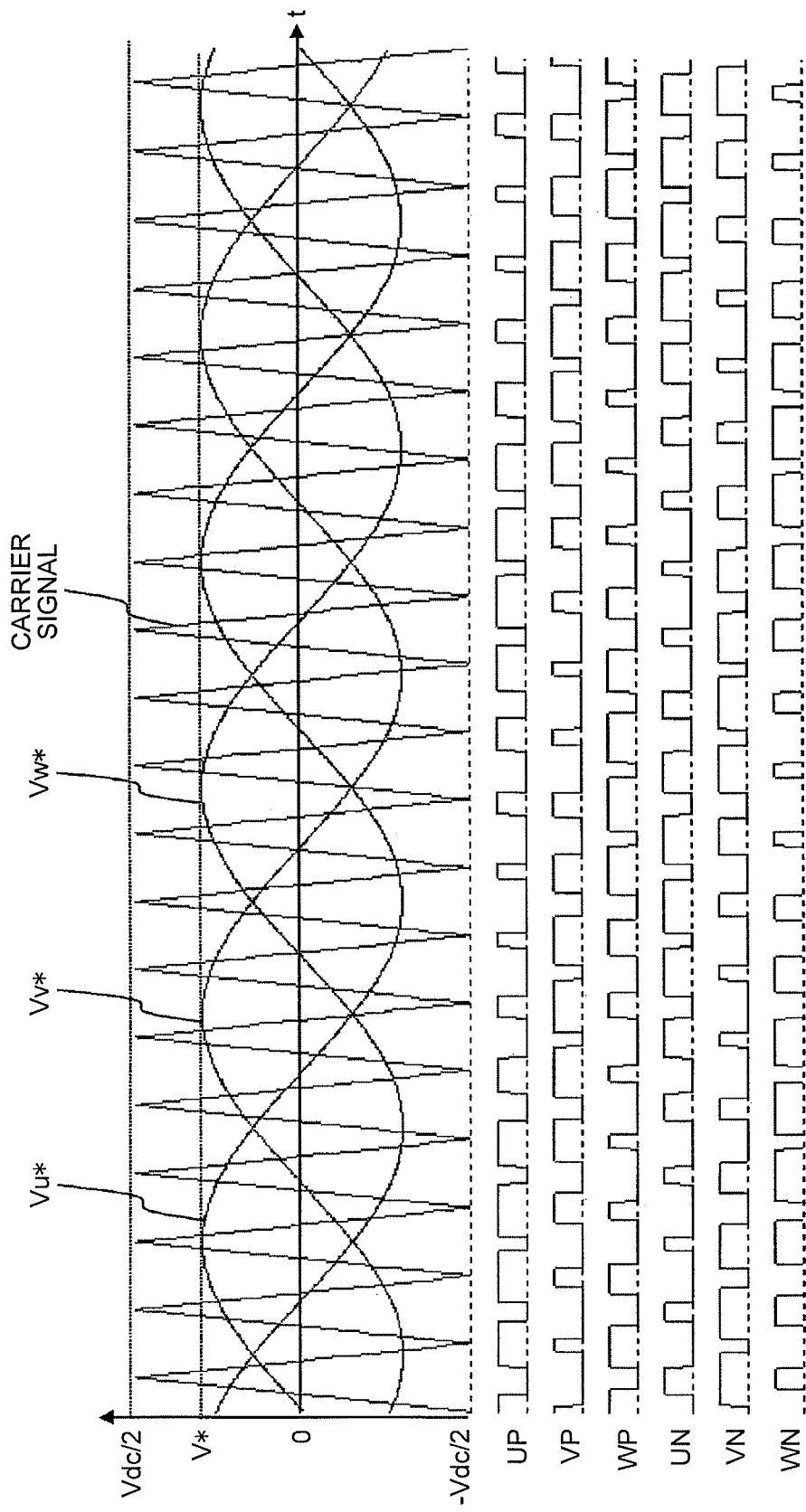
FIG. 4 is a diagram showing input/output waveforms of a PWM-signal generation unit 26 in the first embodiment.

FIG. 4 is a chart showing input/output waveforms of the PWM-signal generation unit 26 according to the first embodiment.

For example, the voltage command values Vu*, Vv* and Vw* are defined as cosine waves (sine waves) having phases different by $2\pi/3$ as shown in Equations (1) to (3). Herein, V* denotes an amplitude of the voltage command value, and θ denotes a phase of the voltage command value.

$$Vu^* = V^* \cos\theta \tag{1}$$

$$Vv^* = V^* \cos(\theta - (2/3)\pi) \tag{2}$$

$$Vw^* = V^* \cos(\theta + (2/3)\pi) \tag{3}$$

The voltage-command generation unit 25 calculates the voltage command values Vu*, Vv* and Vw* according to Equations (1) to (3) based on the voltage command value V* outputted by the selection unit 23 and the voltage phase θ obtained by the integrator 24, and outputs the calculated voltage command values Vu*, Vv* and Vw* to the PWM-signal generation unit 26. The PWM-signal generation unit 26 compares the voltage command values Vu*, Vv* and Vw* with a carrier signal (reference signal) having an amplitude Vdc/2 at a predetermined frequency, and generates PWM signals UP, VP, WP, UN, VN and WN based on a magnitude relation to each other.

For example, when the voltage command value Vu* is larger than the carrier signal, UP is set to a voltage for turning on the switching element 17a, and UN is set to a voltage for turning off the switching element 17d. On the other hand, when the voltage command value Vu* is smaller than the carrier signal, inversely, UP is set to a voltage for turning off the switching element 17a, and UN is set to a voltage for turning on the switching element 17d. The same applies to other signals, and VP and VN are determined based on the comparison between the voltage command value Vv* and the carrier signal, and WP and WN are determined based on the comparison between the voltage command value Vw* and the carrier signal.

In a case of a general inverter, because a complementary PWM system is adopted therefor, UP and UN, VP and VN, and WP and WN have an inverse relationship to each other. Therefore, there are eight switching patterns in total.

FIG. 5 is a chart showing eight switching patterns in the first embodiment. In FIG. 5, reference symbols V0 to V7 denote voltage vectors generated in the respective switching patterns. The voltage direction of the respective voltage vectors is indicated by ±U, ±V and ±W (and 0 when the voltage is not generated). Here, "+U" means a voltage for generating a current in the U-phase direction, which flows into the motor 8 via the U-phase and flows out from the motor 8 via the V-phase and the W-phase, and "−U" means a voltage for generating a current in the −U phase direction, which flows into the motor 8 via the V-phase and the W-phase and flows out from the motor 8 via the U-phase. The same applies to ±V and ±W.

The inverter 9 can be caused to output desired voltages by combining the switching patterns shown in FIG. 5 and outputting a voltage vector. At this time, a high frequency voltage can be outputted by changing the phase θ at a high speed.

The voltage command values Vu*, Vv* and Vw* may be obtained in two-phase modulation, triple harmonic superimposition modulation, space vector modulation, and the like other than Equations (1) to (3).

Figure 6:
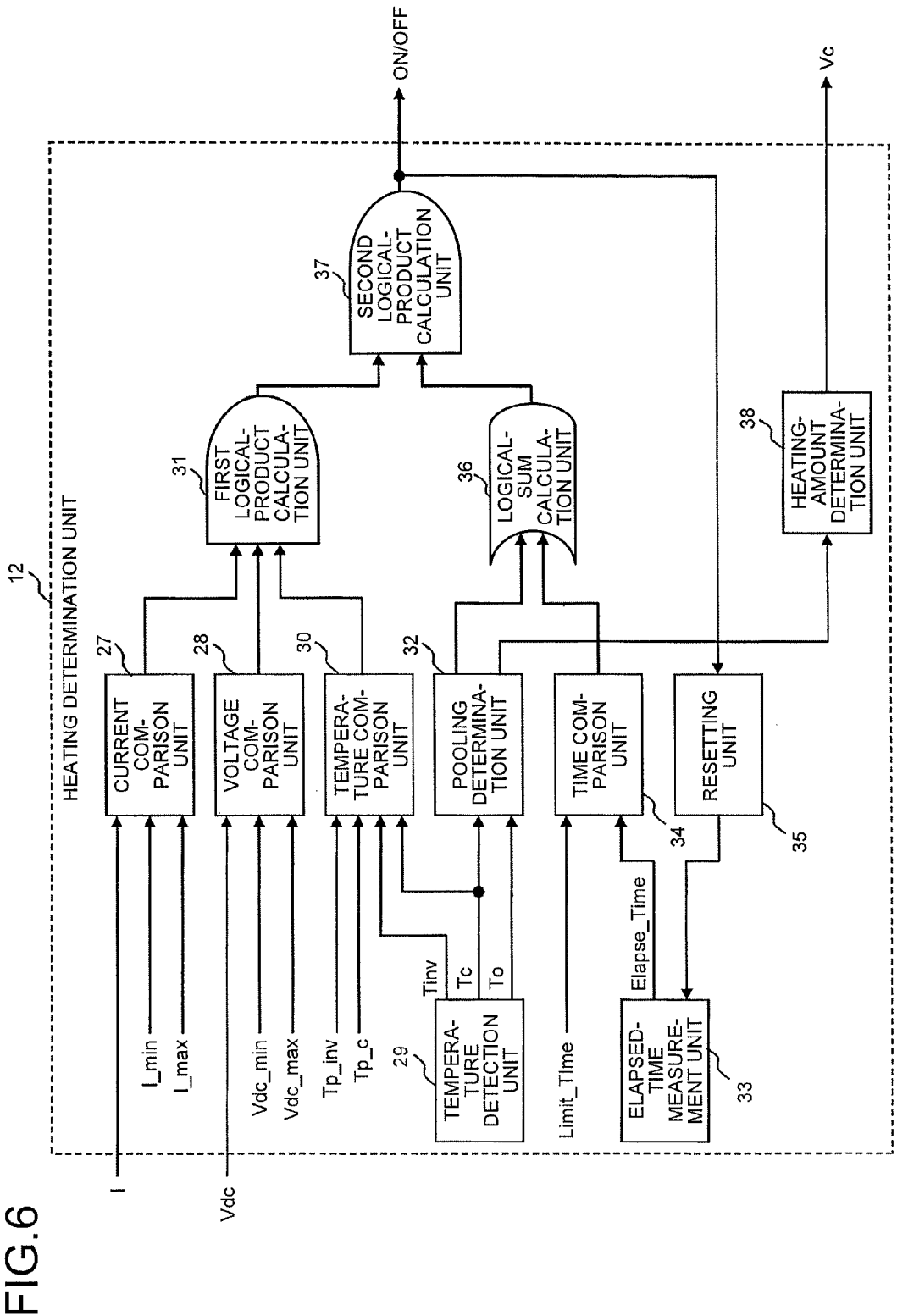
FIG. 6 is a diagram showing a configuration of a heating determination unit 12 in the first embodiment.

FIG. 6 is a diagram showing a configuration of the heating determination unit 12 according to the first embodiment.

The heating determination unit 12 controls an operation state (ON/OFF) of the high-frequency-voltage generation unit 11 based on the bus voltage Vdc detected by the bus-voltage detection unit 16 of the inverter 9, the current I detected by the current detection unit 20 of the inverter 9, and the like.

The heating determination unit 12 includes a current comparison unit 27, a voltage comparison unit 28, a temperature detection unit 29, a temperature comparison unit 30, a first logical-product calculation unit 31, a pooling determination unit 32, an elapsed-time measurement unit 33, a time comparison unit 34, a resetting unit 35, a logical-sum calculation unit 36, a second logical-product calculation unit 37, and a heating-amount determination unit 38.

The current comparison unit 27 outputs "1" with judging that it is a normal state when the current I detected and outputted by the current detection unit 20 is in a state of Imin<I<Imax, but outputs "0" when not in the state.

The Imax is an upper limit of the current, and the Imin is a lower limit of the current. When an excessive positive current equal to or larger than the Imax or an excessive negative current equal to or smaller than the Imin flows, the current comparison unit 27 determines that the current I is in an abnormal state and outputs "0", thereby operating to stop heating.

The voltage comparison unit 28 determines that the bus voltage Vdc is in a normal state when the bus voltage Vdc detected by the bus-voltage detection unit 16 is in a state of Vdc_min<Vdc<Vdc_max and outputs "1", but outputs "0" in other cases.

The Vdc_max is an upper limit of the bus voltage, and the Vdc_min is a lower limit of the bus voltage. In the case of an excessive high bus voltage equal to or higher than the Vdc_max or an excessive low bus voltage equal to or lower than the Vdc_min, the voltage comparison unit 28 determines that the bus voltage is in an abnormal state and outputs "0", thereby operating to stop heating.

The temperature detection unit 29 detects an inverter temperature Tinv that is a temperature of the voltage application unit 19, a temperature Tc of the compressor 1, and an outside air temperature To.

The temperature comparison unit 30 compares a preset protective temperature Tp_inv of the inverter with the inverter temperature Tinv, and compares a preset protective temperature Tp_c of the compressor 1 with the compressor temperature Tc. The temperature comparison unit 30 determines that a normal operation is currently performed in a state of Tp_inv>Tinv and in a state of Tp_c>Tc and outputs "1", but outputs "0" in other cases.

In a case of Tp_inv<Tinv, the inverter temperature is high, and in a case of Tp_c<Tc, the winding temperature of the motor 8 in the compressor 1 is high, and so an insulation failure or the like may occur. Therefore, the temperature comparison unit 30 determines that it is dangerous, outputs "0", and operates to stop the heating. The Tp_c needs to be set, taking into consideration a fact that the compressor 1 has a larger heat capacity than the winding of the motor 8 and the temperature rising speed is lower than that of the winding.

The first logical-product calculation unit 31 outputs a logical product of output values of the current comparison unit 27, the voltage comparison unit 28 and the temperature comparison unit 30. When any one or more of the output values of the current comparison unit 27, the voltage comparison unit 28 and the temperature comparison unit 30 is 0, which indicates an abnormal state, the first logical-product calculation unit 31 outputs "0" to operate to stop the heating.

A method of stopping heating using the current I, the bus voltage Vdc, and the temperatures Tinv and Tc has been explained. However, not all of these values need to be used. Heating may be stopped using a parameter other than these values.

Subsequently, the pooling determination unit 32 determines whether or not a liquid refrigerant is retained in the compressor 1 (the refrigerant is pooled) based on the temperature Tc of the compressor 1 and the outside air temperature To detected by the temperature detection unit 29.

Because the compressor 1 has the largest heat capacity in the refrigeration cycle, and the compressor temperature Tc rises slower compared to the rise of the outdoor air temperature To, the temperature thereof becomes the lowest. Because the refrigerant stays in a place where the temperature is the lowest in the refrigeration cycle, and accumulates as the liquid refrigerant, the refrigerant accumulates in the compressor 1 at the time of temperature rise. In a case of To>Tc, the pooling determination unit 32 determines that the refrigerant stays in the compressor 1, outputs "1" to start heating, and stops the heating when To<Tc.

Control may be executed to start heating when the Tc is in a rising trend or when the To is in a rising trend, and when detection of the Tc or To becomes difficult, the control can be realized using either one of them, thereby enabling to realize highly reliable control.

When both the compressor temperature Tc and the external temperature To can not be detected, heating of the compressor 1 may be impossible. Therefore, the elapsed-time measurement unit 33 measures a time for which the compressor 1 is not heated (Elapse_Time). When a time limit Limit_Time preset by the time comparison unit 34 is exceeded, the elapsed-time measurement unit 33 outputs "1" to start heating of the compressor 1. Because the temperature change in a day is such that temperature rises from morning when the sun rises toward daytime, and temperature drops from evening toward night, temperature rise and drop are repeated in a cycle of roughly 12 hours. For this reason, for example, the Limit_Time may be set to about 12 hours.

The Elapse_Time is set to "0" by the resetting unit 35, when the heating of the compressor 1 is executed.

The logical-sum calculation unit 36 outputs a logical sum of output values of the pooling determination unit 32 and the time comparison unit 34. When at least one of the output values of the pooling determination unit 32 and the time comparison unit 34 becomes "1" indicating starting of the heating, the logical-sum calculation unit 36 outputs "1" to start heating of the compressor "1".

The second logical-product calculation unit 37 outputs a logical product of the output values of the first logical-product calculation unit 31 and the logical-sum calculation unit 36 as an output value of the heating determination unit 12. When the output value is 1, the high-frequency-voltage generation unit 11 is actuated to perform a heating operation of the compressor 1. On the other hand, when the output value is 0, the high-frequency-voltage generation unit 11 is not actuated, and the heating operation of the compressor 1 is not performed, or the operation of the high-frequency-voltage generation unit 11 is stopped to stop the heating operation of the compressor 1.

Because the second logical-product calculation unit 37 outputs the logical product, when a signal "0" for stopping heating of the compressor 1 is being outputted by the first logical-product calculation unit 31, the heating can be stopped even if a signal "1" indicating starting of heating is outputted to the logical-sum calculation unit 36. Therefore, it is possible to realize the heat pump device that can minimize power consumption in a standby mode while ensuring certain reliability.

The pooling determination unit 32 detects a state where a liquid refrigerant is stayed in the compressor 1 based on the compressor temperature Tc and the external temperature To. Furthermore, the heating-amount determination unit 38 determines the amount of the liquid refrigerant retained in the compressor 1 based on the compressor temperature Tc and the external temperature To. The heating-amount determination unit 38 then calculates and outputs the voltage command value Vc required for expelling the refrigerant to outside of the compressor 1 according to the determined amount of the liquid refrigerant. Accordingly, the state where the liquid refrigerant is retained in the compressor 1 can be resolved with the minimum necessary electric power, and the influence on global warming can be reduced with the power consumption being reduced.

An operation of the inverter control unit 10 is explained next.

Figure 7:
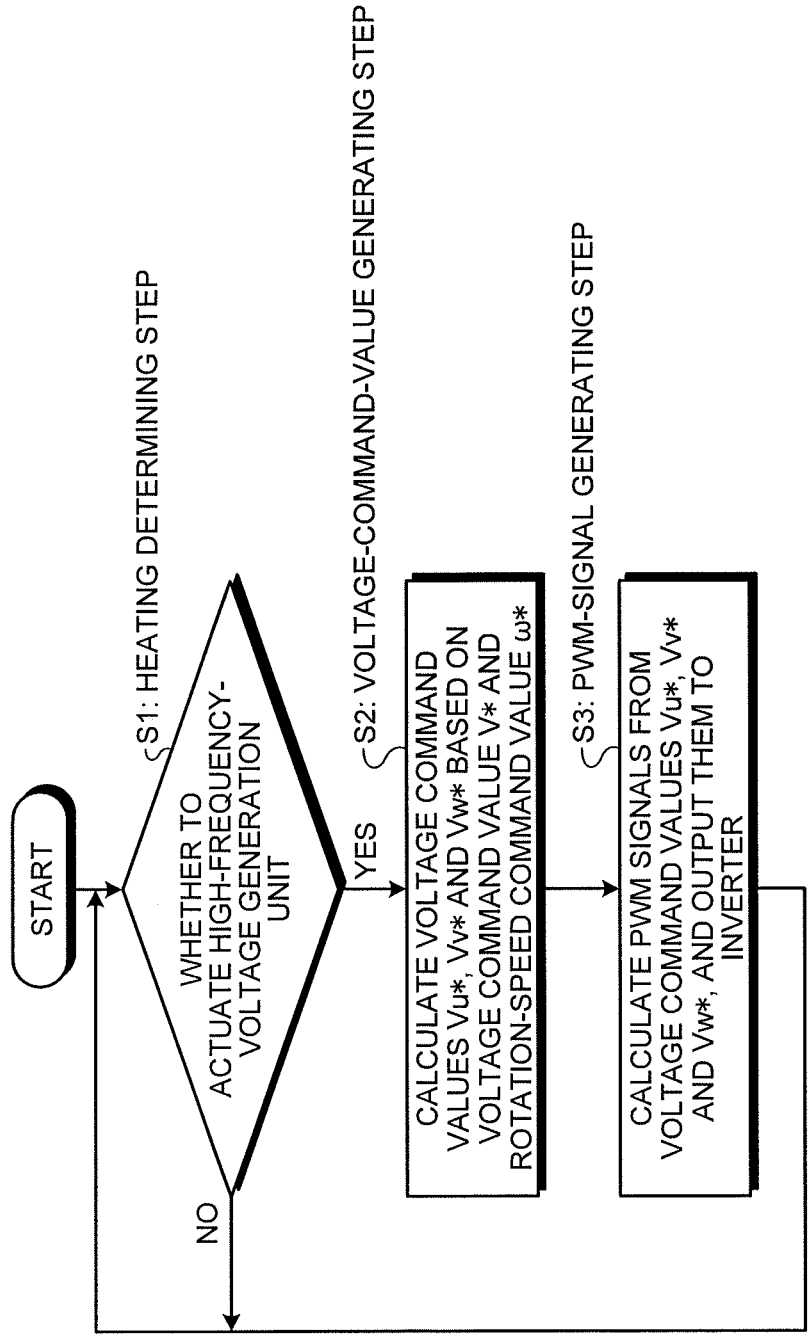
FIG. 7 is a flowchart showing an operation of the inverter control unit 10 according to the first embodiment.

FIG. 7 is a flowchart showing an operation of the inverter control unit 10 in the first embodiment.

(S1: Heating Determining Step)

The heating determination unit 12 determines whether to actuate the high-frequency-voltage generation unit 11 by the operation described above during shutdown of the compressor 1.

When the heating determination unit 12 determines that the high-frequency-voltage generation unit 11 should be actuated, that is, when the output value of the heating determination unit 12 is "1" (ON) (YES at S1), the process proceeds to S2 to generate PWM signals for heating. On the other hand, when the heating determination unit 12 determines that the high-frequency-voltage generation unit 11 should not be actuated, that is, when the output value of the heating determination unit 12 is "0" (OFF) (NO at S1), the heating determination unit 12 determines whether to actuate the high-frequency-voltage generation unit 11 again after a predetermined time has passed.

(S2: Voltage-Command-Value Generating Step)

The selection unit 23 selects the voltage command value V* and the rotation-speed command value ω*, and the integrator 24 obtains the voltage phase θ based on the rotation-speed command value ω* selected by the selection unit 23. The voltage-command generation unit 25 calculates the voltage command values Vu*, Vv* and Vw* according to Equations (1) to (3) based on the voltage command value V* selected by the selection unit 23 and the voltage phase θ obtained by the integrator 24, and outputs the calculated voltage command values Vu*, Vv* and Vw* to the PWM-signal generation unit 26.

(S3: PWM-Signal Generating Step)

The PWM-signal generation unit 26 compares the voltage command values Vu*, Vv* and Vw* outputted by the voltage-command generation unit 25 with the carrier signal to obtain the PWM signals UP, VP, WP, UN, VN and WN, and outputs these PWM signals to the inverter 9. Accordingly, the switching elements 17a to 17f of the inverter 9 are driven to apply a high-frequency voltage to the motor 8.

By applying the high-frequency voltage to the motor 8, the motor 8 is efficiently heated by iron loss of the motor 8 and copper loss generated by the current flowing in the winding. By the motor 8 being heated, the liquid refrigerant stagnating in the compressor 1 is heated and evaporated, and leaked to outside of the compressor 1.

After a predetermined time has passed, the heating determination unit 12 returns to S1 again, and determines whether further heating is required.

As described above, in the heat pump device 100 according to the first embodiment, when the liquid refrigerant is stagnating in the compressor 1, the high-frequency voltage is applied to the motor 8, so that the motor 8 can be efficiently heated while restraining noise. Accordingly, the refrigerant retained in the compressor 1 can be efficiently heated, and the retained refrigerant can be leaked to outside of the compressor 1.

When the high-frequency voltage having a frequency equal to or higher than an operation frequency at the time of a compression operation is applied to the motor 8, a rotor in the motor 8 can not follow the frequency, and any rotations or vibrations are not generated. Therefore, at S2, the selection unit 23 had better output a rotation-speed command value ω* equal to or higher than the operation frequency at the time of the compression operation.

Generally, the operation frequency at the time of the compression operation is 1 kHz at most. Therefore, a high frequency voltage having a frequency equal to or larger than 1 kHz only has to be applied to the motor 8. When a high frequency voltage having a frequency equal to or higher than 14 kHz is applied to the motor 8, vibration sound of an iron core of the motor 8 approaches nearly an upper limit of an audible frequency, so that there is an effect for reducing noise. To this end, for example, the selection unit 23 outputs the rotation-speed command value ω* for leading to a high frequency voltage of about 20 kHz.

However, when the frequency of the high frequency voltage exceeds the maximum rated frequency of the switching elements 17a to 17f, a load or power supply short-circuit may occur due to breakage of the switching elements 17a to 17f, and it can lead to generation of smoke or fire. For this reason, it is desired to set the frequency of the high-frequency voltage to be equal to or lower than the maximum rated frequency in order to ensure reliability.

Furthermore, to achieve a high efficiency, a motor having an IPM (Interior Permanent Magnet) structure or a concentrated winding motor having a small coil end and a low winding resistance has been widely used for the recent compressor motor for a heat pump device. The concentrated winding motor has a small winding resistance and a small amount of heat generation due to copper loss, and thus a large amount of current needs to be caused to flow to the winding. If a large amount of current is caused to flow to the winding, then the current flowing to the inverter 9 also increases, thereby increasing inverter loss.

Therefore, if heating by applying the high-frequency voltage described above is performed, then an inductance component by the high frequency increases, thereby increasing winding impedance. Accordingly, although the current flowing to the winding decreases and the copper loss is reduced, iron loss due to the application of the high-frequency voltage occurs corresponding to the amount of copper loss, thereby enabling to perform efficient heating. Furthermore, because the current flowing to the winding decreases, the current flowing to the inverter also decreases, thereby enabling to reduce the loss of the inverter 9 and perform more efficient heating.

If heating by applying the high-frequency voltage described above is performed, when the compressor is based on a motor having the IPM structure, a rotor surface where high-frequency magnetic fluxes interlink with each other also becomes a heat generating portion. Therefore, increase in an area contacting the refrigerant and prompt heating of the compression mechanism can be realized, thereby enabling to perform efficient heating of the refrigerant.

At present, generally, the mainstream trend is to use silicon (Si) as a material of a semiconductor for the switching elements 17a to 17f that constitute the inverter 9 and the reflux diodes 18a to 18f that are connected to the respective switching elements 17a to 17f in parallel. However, instead of this type of semiconductor, a wide bandgap semiconductor whose material is silicon carbide (SiC), gallium nitride (GaN) or diamond may be used.

Switching elements and diode elements made from such a wide bandgap semiconductor have a high voltage resistance and a high allowable current density. Therefore, downsizing of the switching elements and diode elements is possible, and by using these downsized switching elements and diode elements, downsizing of a semiconductor module having these elements incorporated therein can be realized.

The switching elements and the diode elements made from such a wide bandgap semiconductor have a high heat resistance. Accordingly, downsizing of a radiator fin of a heat sink and air cooling of a water cooling part can be realized, thereby enabling further downsizing of the semiconductor module.

Furthermore, the switching elements and the diode elements made from such a wide bandgap semiconductor have low power loss. Therefore, the switching elements and the diode elements can be made to have a high efficiency, thereby enabling to make the semiconductor module highly efficient.

While it is desired that both the switching elements and the diode elements are made from a wide bandgap semiconductor, it is also sufficient that either the switching or diode elements are made from a wide bandgap semiconductor, and even in this case, effects described in the present embodiment can be achieved.

Besides, identical effects can be produced by using a MOSFET (Metal-Oxide-Semiconductor Field-Effect Transistor) having a super junction structure that is known as a highly efficient switching element.

In a compressor having a scroll mechanism, high-pressure relief of a compression chamber is difficult. Therefore, there is a high possibility of causing breakage of the compression mechanism due to an excessive stress applied to the compression mechanism in a case of liquid compression, as compared to a compressor of other systems. However, in the heat pump device 100 according to the first embodiment, efficient heating of the compressor 1 is possible, and stagnation of a liquid refrigerant in the compressor 1 can be suppressed. Accordingly, liquid compression can be prevented, the heat pump device 100 is beneficial even when a scroll compressor is used as the compressor 1.

Furthermore, in the case of a heating device having a frequency of 10 kHz and an output exceeding 50 W, the heating device may be subjected to the restriction of laws and regulations. For this reason, it may as well be admitted that an amplitude of the voltage command value is adjusted so as not to exceed 50 W in advance, and/or feedback control is executed with detecting the flowing current and the voltage so as to be 50 W or less.

The inverter control unit 10 is configured by a CPU (Central Processing Unit), a DSP (Digital Signal Processor), a microcomputer, an electronic circuit or the like.

Second Embodiment

In a second embodiment, a method of generating a high frequency voltage is described.

In a case of a general inverter, a carrier frequency, that is a frequency of a carrier signal, has an upper limit that is determined by a switching speed of switching elements of the inverter. Therefore, it is difficult to output a high frequency voltage having a frequency equal to or higher than the carrier frequency. In a case of a general IGBT (Insulated Gate Bipolar Transistor), the upper limit of the switching speed is about 20 kHz.

When the frequency of the high frequency voltage becomes about $\frac{1}{10}$ of the carrier frequency, an adverse effect may occur such that the waveform output accuracy of the high frequency voltage deteriorates and DC components are superposed on the high frequency voltage. When the carrier frequency is set to 20 kHz in view of the above, if the frequency of the high frequency voltage is set equal to or lower than 2 kHz that is $\frac{1}{10}$ of the carrier frequency, then the frequency of the high frequency voltage is in an audible frequency domain, and so it is a concern that noise is increased.

Figure 8:
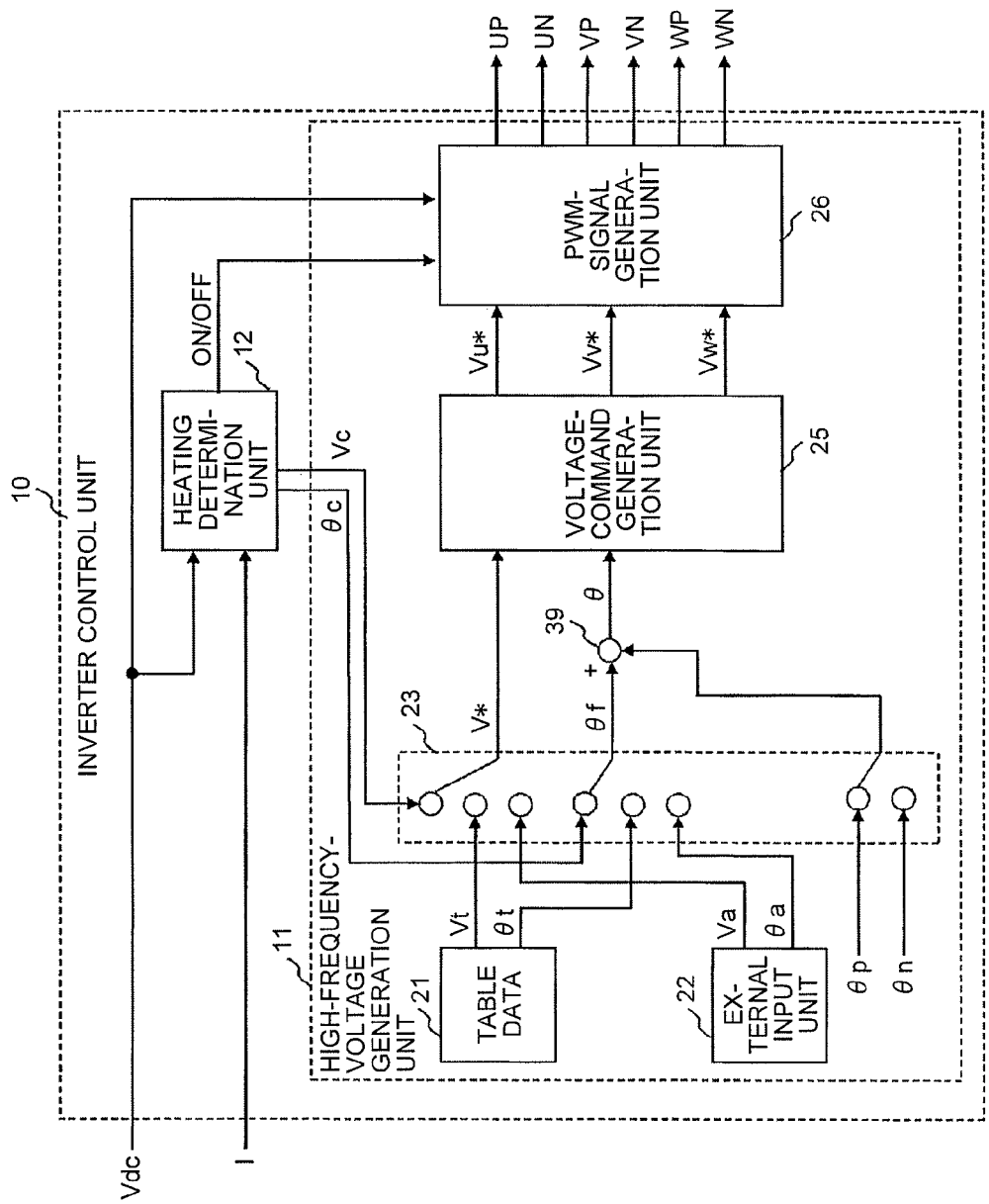
FIG. 8 is a diagram showing a configuration of the inverter control unit 10 according to a second embodiment.

FIG. 8 is a diagram showing a configuration of the inverter control unit 10 according to the second embodiment.

The inverter control unit 10 according to the second embodiment is the same as the inverter control unit 10 according to the first embodiment shown in FIG. 3, except that the high-frequency-voltage generation unit 11 includes an addition unit 39 that adds the phase θp or the phase θn switched by the selection unit 23 to a reference phase θf to make the voltage phase θ, instead of the integrator 24 (see FIG. 3). Therefore, constituent elements identical to those of the first embodiment are denoted by the same reference signs and explanations thereof will be omitted, and only different points are explained.

In the first embodiment, the rotation-speed command value ω* is integrated by the integrator 24 to obtain the voltage phase θ. On the other hand, in the second embodiment, the selection unit 23 (phase switching unit) alternately switches between two types of voltage phases, the phase θp and the phase θn that is different from the phase θp substantially by 180 degrees. The addition unit 39 then adds the phase θp or θn selected by the selection unit 23 to the reference phase θf and designates the obtained phase as the voltage phase θ.

In the explanations below, it is assumed that θp=0 [degree], and θn=180 [degrees].

An operation of the inverter control unit 10 is explained next.

Except for the operation of S2 shown in FIG. 7, operations of the inverter control unit 10 are the same as those of the inverter control unit 10 according to the first embodiment. Therefore, explanations thereof will be omitted.

At S2, the selection unit 23 switches between the phases θp and θn alternately at the timing of either a top (peak) or bottom (valley) of a carrier signal or at the timings of the top and bottom of the carrier signal. The addition unit 39 adds the phase θp or phase θn selected by the selection unit 23 to the reference phase θf, designates the obtained phase as the voltage phase θ, and outputs the voltage phase θ to the voltage-command generation unit 25. The voltage-command generation unit 25 obtains the voltage command values Vu*, Vv* and Vw* according to Equations (1) to (3) using the voltage phase θ and the voltage command value V*, and outputs the voltage command values Vu*, Vv* and Vw* to the PWM-signal generation unit 26.

Because the selection unit 23 switches between the phases θp and θn at the timing of the top or bottom, or at the timings of the top and bottom of the carrier signal, the PWM signal synchronized with the carrier signal can be outputted.

Figure 9:
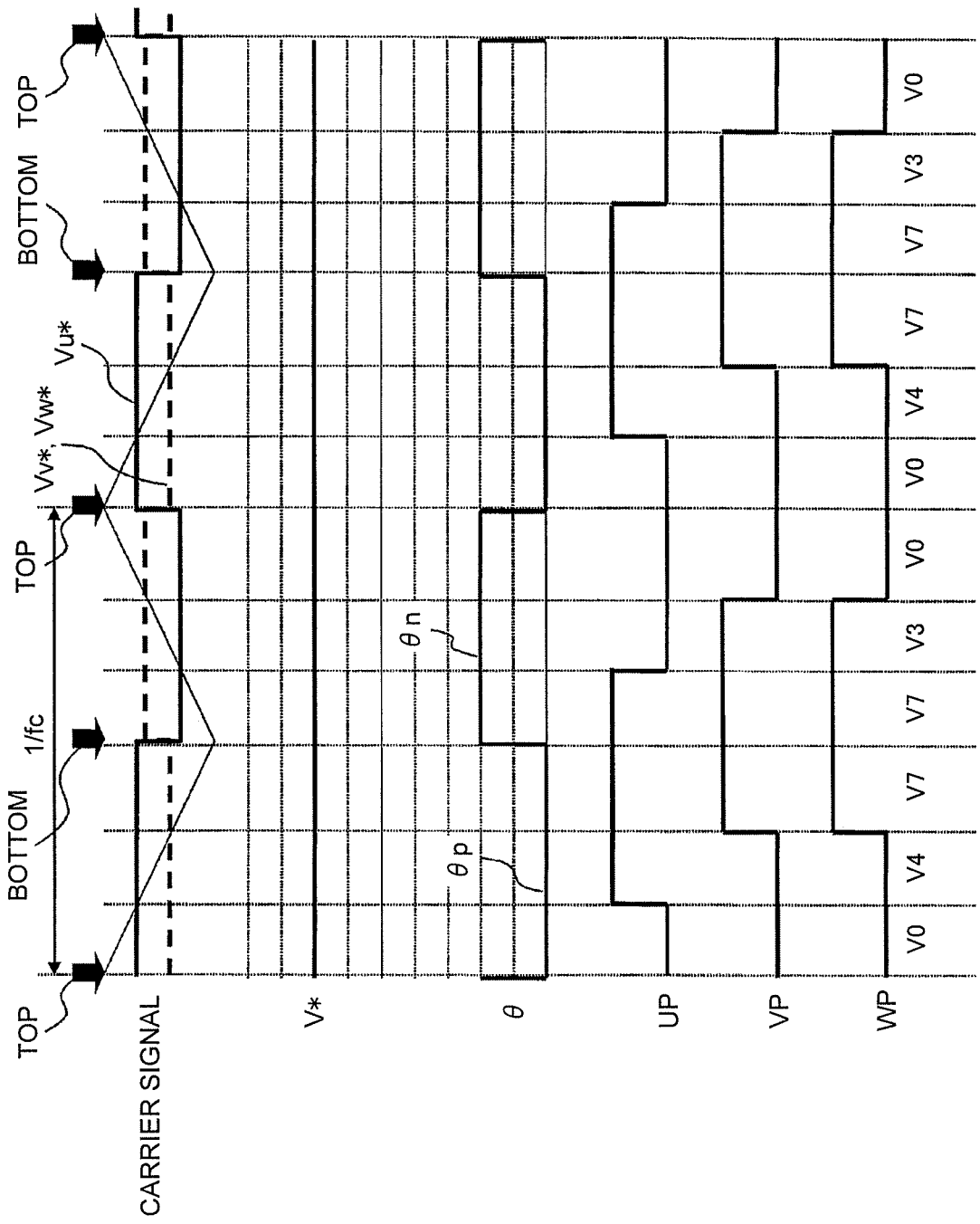
FIG. 9 is a timing chart when a phase θp and a phase θn are alternately switched by a selection unit 23 at a timing of a top and a bottom of a carrier signal.

FIG. 9 is a timing chart when the phase θp and the phase θn are alternately switched by the selection unit 23 at timings of a top and a bottom of a carrier signal. Because the UP, VP and WP are opposite in ON/OFF state to UN, VN and WN, respectively and when the state of one signal is ascertained, the other one can be ascertained, only UP, VP and WP are described here. It is assumed here that θf=0 [degree].

In this case, a PWM signal changes as shown in FIG. 9. The voltage vector changes in order of V0 (UP=VP=WP=0), V4 (UP=1, VP=WP=0), V7 (UP=VP=WP=1), V3 (UP=0, VP=WP=1), V0 (UP=VP=WP=0), and so on.

Figure 10:
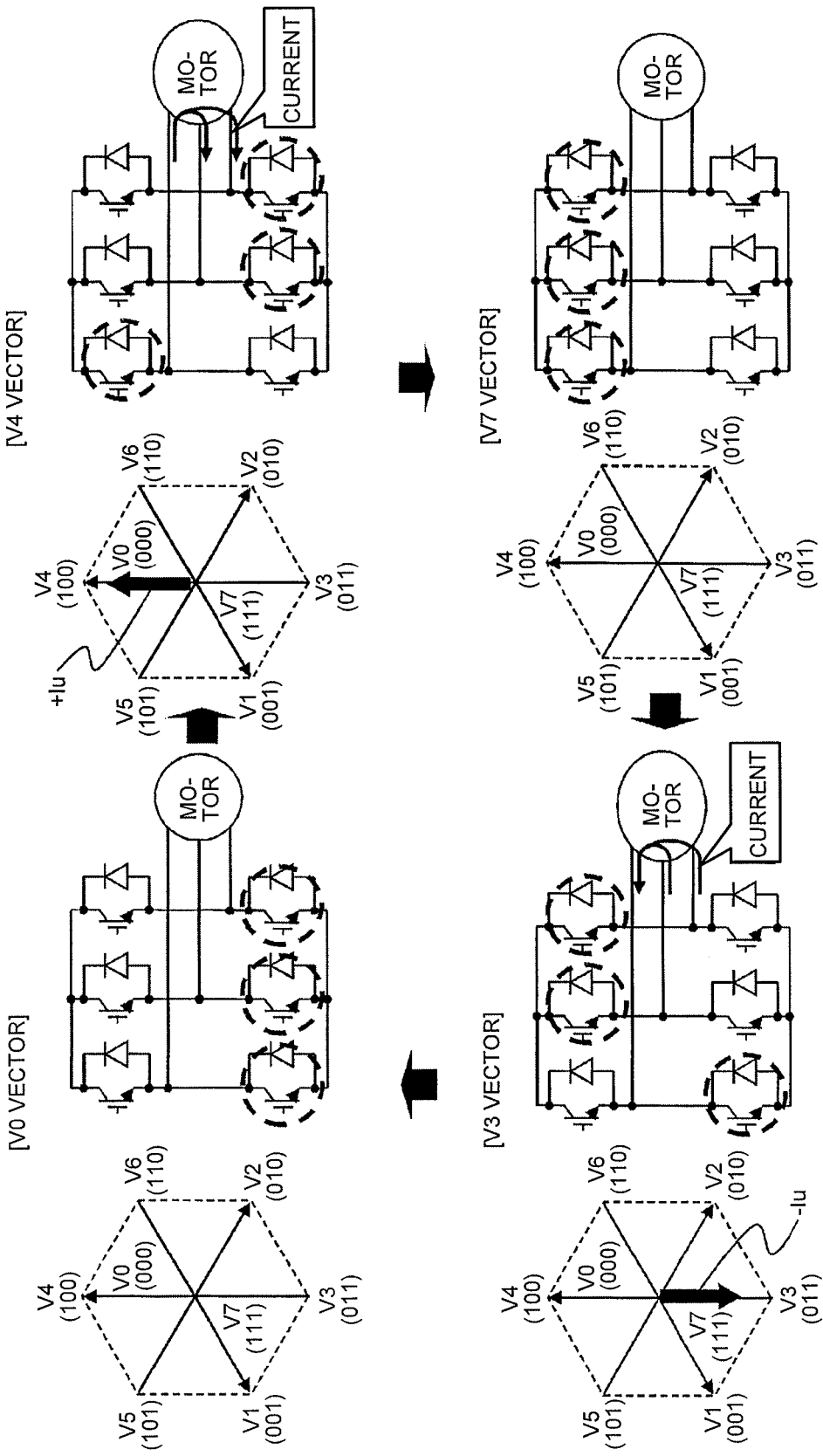
FIG. 10 is an explanatory diagram of changes of a voltage vector shown in FIG. 9.

FIG. 10 is an explanatory diagram of a change of the voltage vector shown in FIG. 9. In FIG. 10, it is indicated that the switching element 17 surrounded by a broken line is ON, and the switching element 17 not surrounded by a broken line is OFF.

As shown in FIG. 10, at the time of applying the V0 vector and the V7 vector, lines of the motor 8 are short-circuited; therefore, it is a no-current-flowing period during which any voltage is not outputted. In this case, the energy accumulated in the inductance of the motor 8 becomes a current, and the current flows in the short circuit. At the time of applying the V4 vector, a current (current of +Iu current) flows in the direction of the U-phase, in which the current flows into the motor 8 via the U-phase and flows out from the motor 8 via the V-phase and the W-phase, and at the time of applying the V3 vector, a current (current of −Iu) flows to the winding of the motor 8 in the direction of the −U phase, in which the current flows into the motor 8 via the V-phase and the W-phase and flows out from the motor 8 via the U-phase. That is, the current flows to the winding of the motor 8 at the time of applying the V4 vector in the opposite direction to that at the time of applying the V3 vector and vice versa. Because the voltage vector changes in order of V0, V4, V7, V3, V0, and so on, the current of +Iu and the current of −Iu flow to the winding of the motor 8 alternately. Particularly, as shown in FIG. 9, because the V4 vector and the V3 vector appear during one carrier cycle (1/fc), an AC voltage synchronized with a carrier frequency fc can be applied to the winding of the motor 8.

Because the V4 vector (the current of +Iu) and the V3 vector (the current of −Iu) are alternately output, forward and reverse torques are switched instantaneously.

Therefore, because the torque is compensated, the voltage application is possible, while suppressing vibrations of the rotor.

Figure 11:
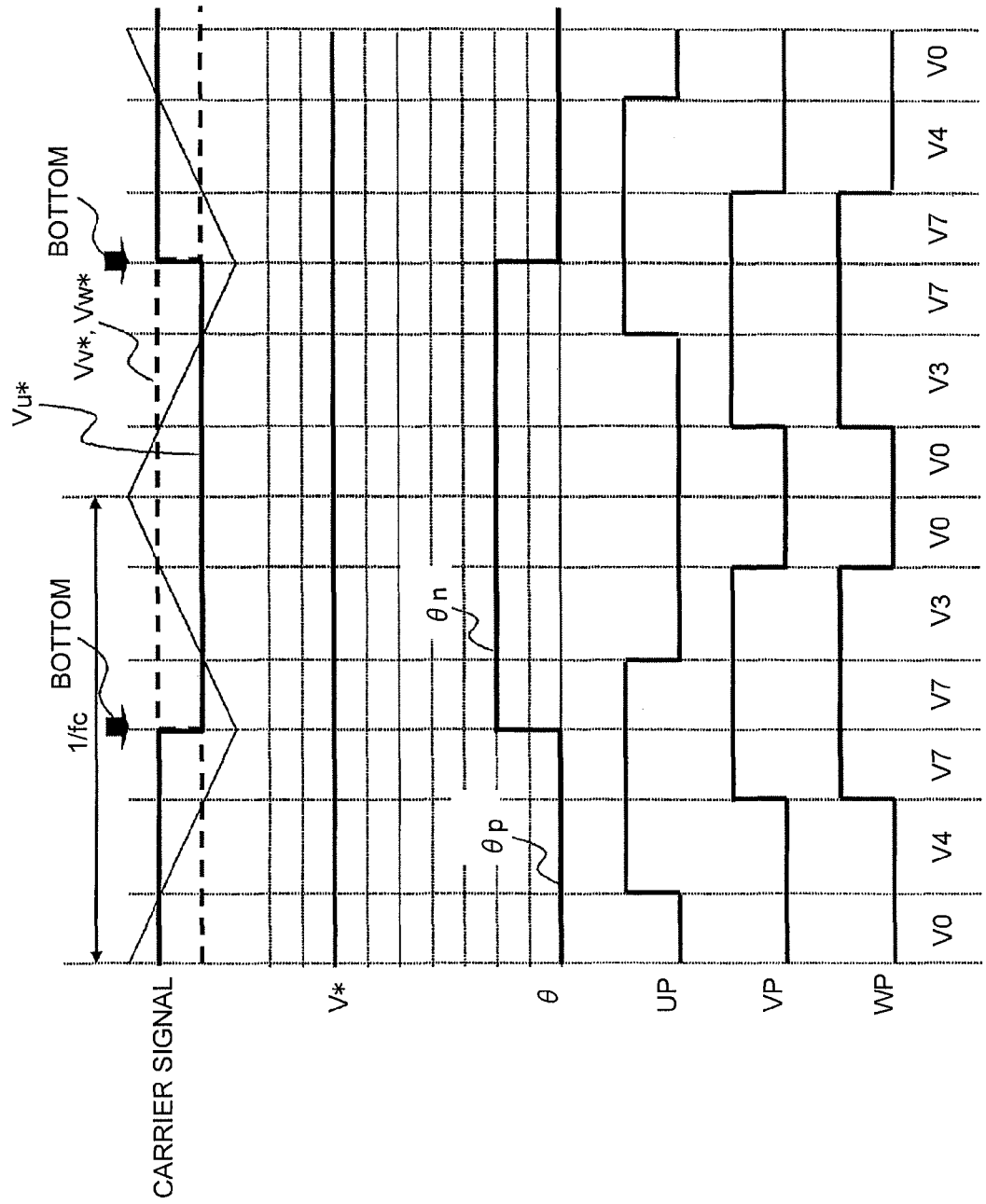
FIG. 11 is a timing chart when the phase θp and the phase θn are alternately switched by the selection unit 23 at a timing of a bottom of a carrier signal.

FIG. 11 is a timing chart when the phase θp and the phase θn are alternately switched by the selection unit 23 at a timing of a bottom of a carrier signal.

In this case, the PWM signal changes as shown in FIG. 11. The voltage vector changes to V0, V4, V7, V7, V3, V0, V0, V3, V7, V7, V4, V0, and so on in this order. Because the V4 vector and the V3 vector appear during two carrier cycles, an AC voltage having a frequency half the carrier frequency can be applied to the winding of the motor 8.

Figure 12:
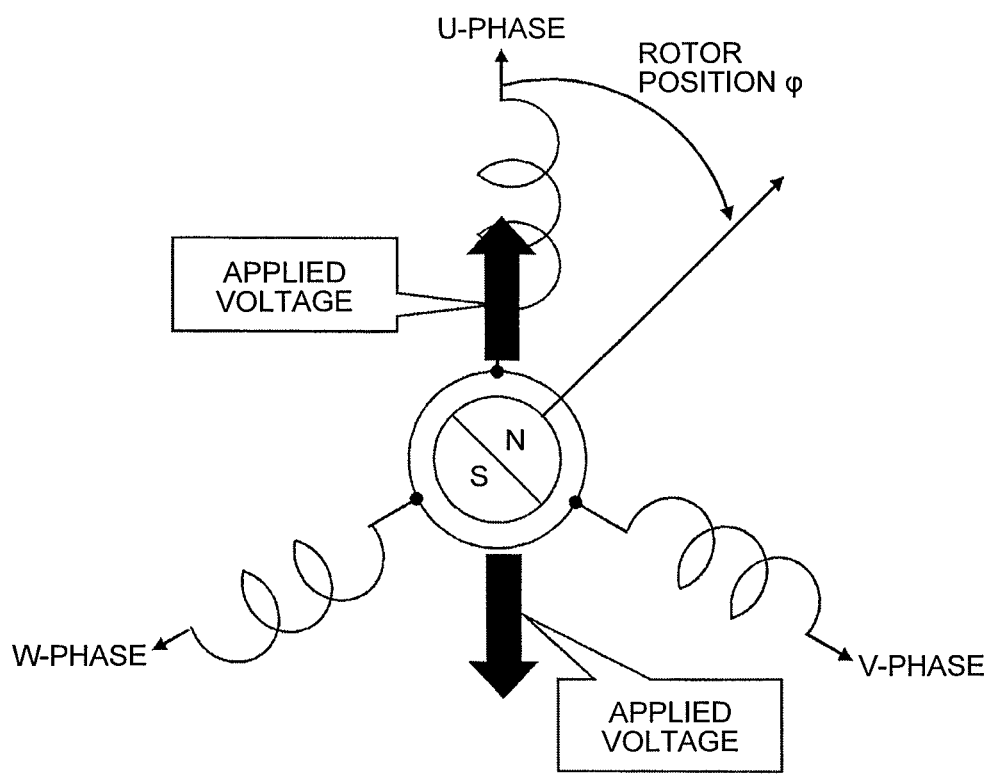
FIG. 12 is an explanatory diagram of a rotor position of an IPM motor.

FIG. 12 is an explanatory diagram of a rotor position (a stop position of the rotor) of an IPM motor. A rotor position φ of the IPM motor is expressed here by the size of an angle by which the direction of the N pole of the rotor deviates from the U-phase direction.

Figure 13:
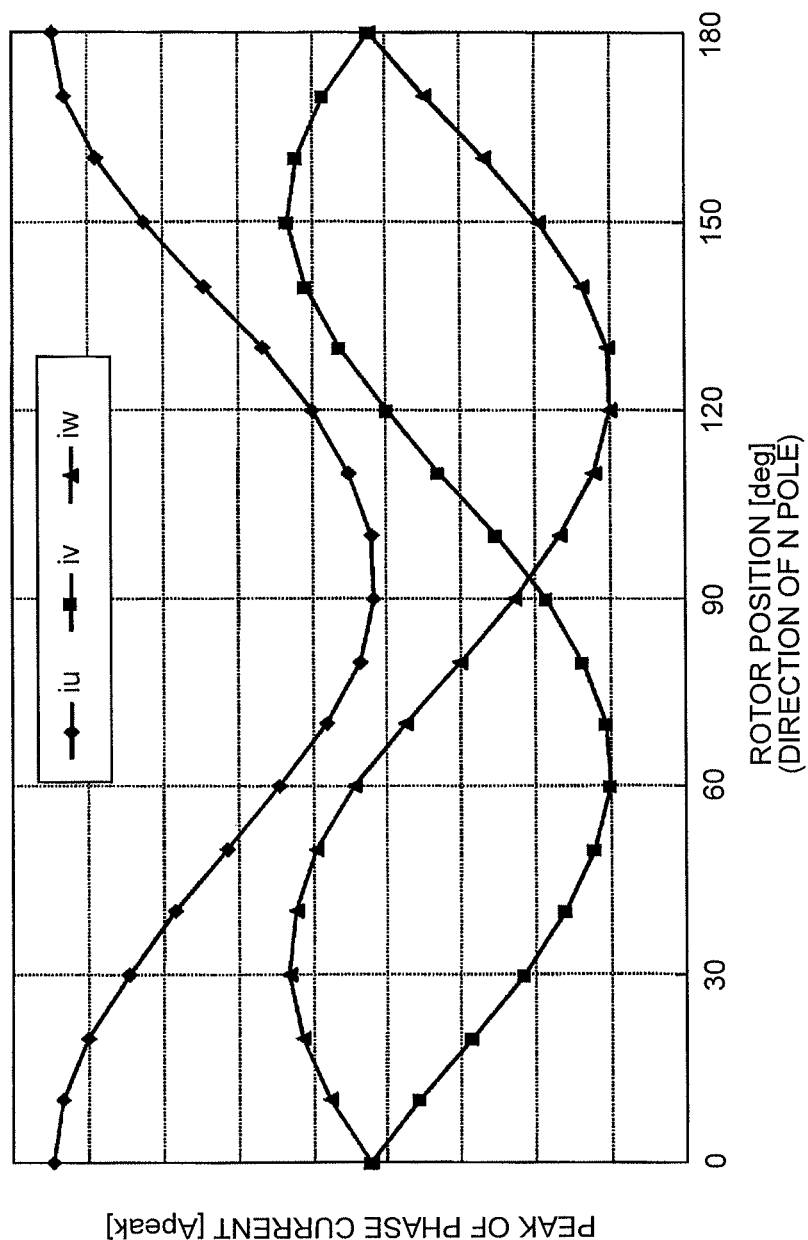
FIG. 13 is a graph showing change of a current depending on a rotor position.

FIG. 13 is a graph showing current change according to a rotor position. In the case of the IPM motor, the winding inductance depends on the rotor position. Therefore, the winding impedance expressed by a product of an electric angle frequency ω and an inductance value fluctuates according to the rotor position. Accordingly, even if the same voltage is applied, a current flowing to the winding of the motor 8 changes depending on the rotor position, and a heating amount changes. As a result, a large amount of power may be consumed to obtain the required heating amount, depending on the rotor position.

Therefore, the reference phase θf is changed with a lapse of time to apply a voltage to the rotor evenly.

Figure 14:
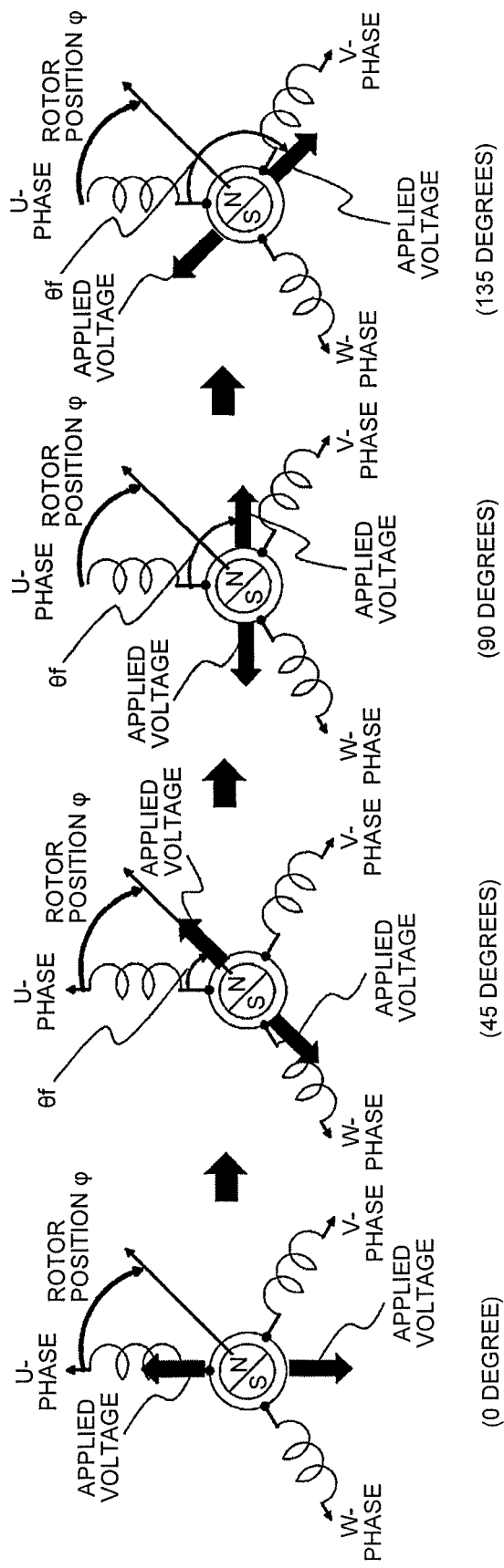
FIG. 14 is a diagram showing an applied voltage when θf is changed with a lapse of time.

FIG. 14 is an illustration showing applied voltages when the reference phase θf is changed with a lapse of time.

The reference phase θf is changed every 45 degrees with a lapse of time, at 0 degree, 45 degrees, 90 degrees, 135 degrees, and so on. When the reference phase θf is 0 degree, the phase θ of the voltage command value becomes 0 degree and 180 degrees. When the reference phase θf is 45 degrees, the phase θ of the voltage command value becomes 45 degrees and 225 degrees. When the reference phase θf is 90 degrees, the phase θ of the voltage command value becomes 90 degrees and 270 degrees. When the reference phase θf is 135 degrees, the phase θ of the voltage command value becomes 135 degrees and 315 degrees.

That is, the reference phase θf is initially set to 0 degree, and the phase θ of the voltage command value is switched between 0 degree and 180 degrees in synchronization with a carrier signal for a predetermined time. Thereafter, the reference phase θf is switched to 45 degrees, and the phase θ of the voltage command value is switched between 45 degrees and 225 degrees in synchronization with the carrier signal for the predetermined time. Subsequently, the reference phase θf is switched to 90 degrees and so on. In this manner, the phase θ of the voltage command value is switched between 0 degree and 180 degrees, 45 degrees and 225 degrees, 90 degrees and 270 degrees, 135 degrees and 315 degrees, and so on for each predetermined time.

Accordingly, because an energization phase of a high-frequency AC voltage changes with a lapse of time, the influence of inductance characteristics according to a rotor stop position can be eliminated, and the compressor 1 can be heated uniformly, regardless of the rotor position.

Figure 15:
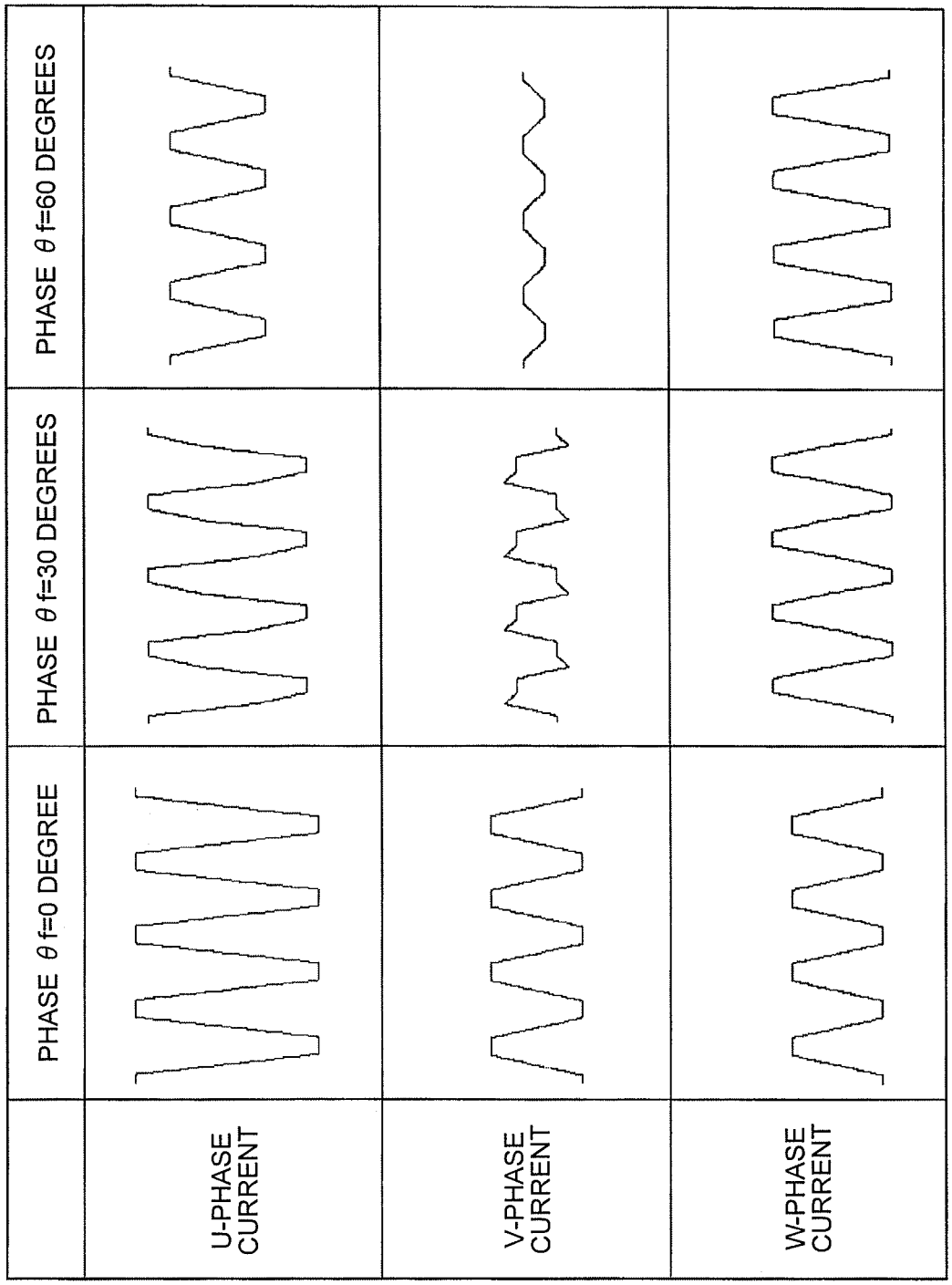
FIG. 15 is a diagram showing currents flowing to respective U-, V- and W-phases of a motor 8 when θf is 0 degree (0 degree in a U-phase (V4) direction), 30 degrees, and 60 degrees.

FIG. 15 is a chart representing currents flowing to the respective U-, V- and W-phases of the motor 8 when the reference phase θf is 0 degree (0 degree in the U-phase (V4) direction), 30 degrees, and 60 degrees.

When the reference phase θf is 0 degree, as shown in FIG. 9, only one other voltage vector (voltage vector in which, of the switching elements 17a to 17f, one switching element on the positive voltage side and two switching elements on the negative voltage side, or two switching elements on the positive voltage side and one switching element on the negative voltage side become an ON state) is generated between V0 and V7. In this case, the current waveform becomes a trapezoidal shape and becomes a current having less harmonic components.

However, when the reference phase θf is 30 degrees, two different voltage vectors are generated between V0 and V7. In this case, the current waveform is distorted, and the current has plenty of harmonic components. The distortion of the current waveform may cause adverse effects including motor noise, motor shaft vibrations, and the like.

When the reference phase θf is 60 degrees, only one other voltage vector is generated between V0 and V7, as in the case of the reference phase θf being 0 degree. In this case, the current waveform becomes a trapezoidal shape and the current has less harmonic components.

In this manner, when the reference phase θf is n times (n is an integer equal to or larger than 0) of 60 degrees, because the voltage phase θ becomes a multiple of 60 degrees (here, θp=0 [degree], θn=180 [degrees]), only one other voltage vector is generated between V0 and V7. Meanwhile, when the reference phase θf is other than n times of 60 degrees, because the voltage phase θ does not become a multiple of 60 degrees, two other voltage vectors are generated between V0 and V7. If two other voltage vectors are generated between V0 and V7, the current waveform is distorted, and the current has plenty of harmonic components, thereby leading to possibility of causing adverse effects including motor noise, motor shaft vibrations, and the like. Therefore, it is desired to change the reference phase θf at 60-degree intervals of 0 degree, 60 degrees, and so on.

As described above, in the heat pump device 100 according to the second embodiment, two types of phases, i.e., the phase θ1 and the phase θ2, which is different from the phase θ1 substantially by 180 degrees, are switched alternately in synchronization with the carrier signal and are designated as the phases of the voltage command values. Accordingly, a high-frequency voltage synchronized with the carrier frequency can be applied to the windings of the motor 8.

Moreover, in the heat pump device 100 according to the second embodiment, the reference phase θf is changed with a lapse of time. Therefore, the energization phase of the high-frequency AC voltage changes with a lapse of time, and thus the compressor 1 can be equally heated regardless of the rotor position.

Third Embodiment

In a third embodiment, an explanation is made of a method of preventing the motor 8 and the inverter 9 from being damaged due to the flow of a large current.

Figure 16:
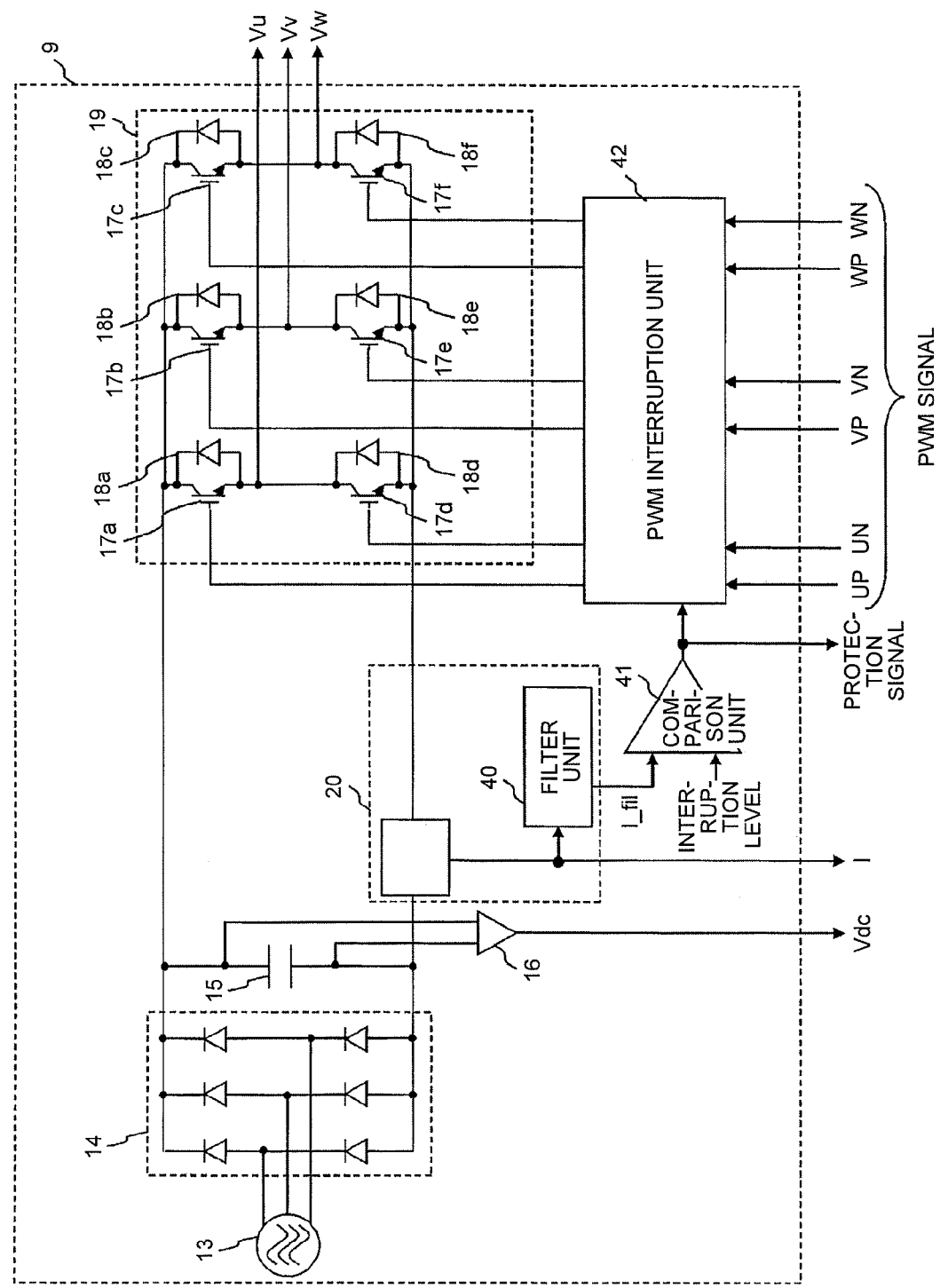
FIG. 16 is a diagram showing a configuration of an inverter 9 according to a third embodiment.

FIG. 16 is a diagram showing a configuration of the inverter 9 according to a third embodiment.

The inverter 9 in the third embodiment is the same as the inverter 9 according to the first embodiment shown in FIG. 2, except for the inclusion of a filter unit 40 in the current detection unit 20 and the inclusion of a comparison unit 41 and a PWM interruption unit 42 (the comparison unit 41 and the PWM interruption unit 42 are collectively referred to as a drive-signal stop unit). Therefore, constituent elements identical to those of the first embodiment are denoted by the same reference signs and explanations thereof will be omitted, and only different points are explained.

The filter unit 40 reduces the value of a current that is at a frequency equal to or higher than a predetermined frequency (first frequency) in the current value I detected by the current detection unit 20 and outputs the current value as a current value I_fil. The comparison unit 41 compares the current value I_fil output from the filter unit 40 with a predetermined interruption level and determines whether the current value I_fil is higher than the interruption level. When it is determined that the current value I_fil is higher than the interruption level, the PWM interruption unit 42 interrupts the output of the PWM signals from the inverter control unit 10 to the inverter 9. Accordingly, the output of the voltage from the inverter 9 to the motor 8 is stopped and thus an excessive current does not flow to the motor 8 and the inverter 9.

Figure 17:
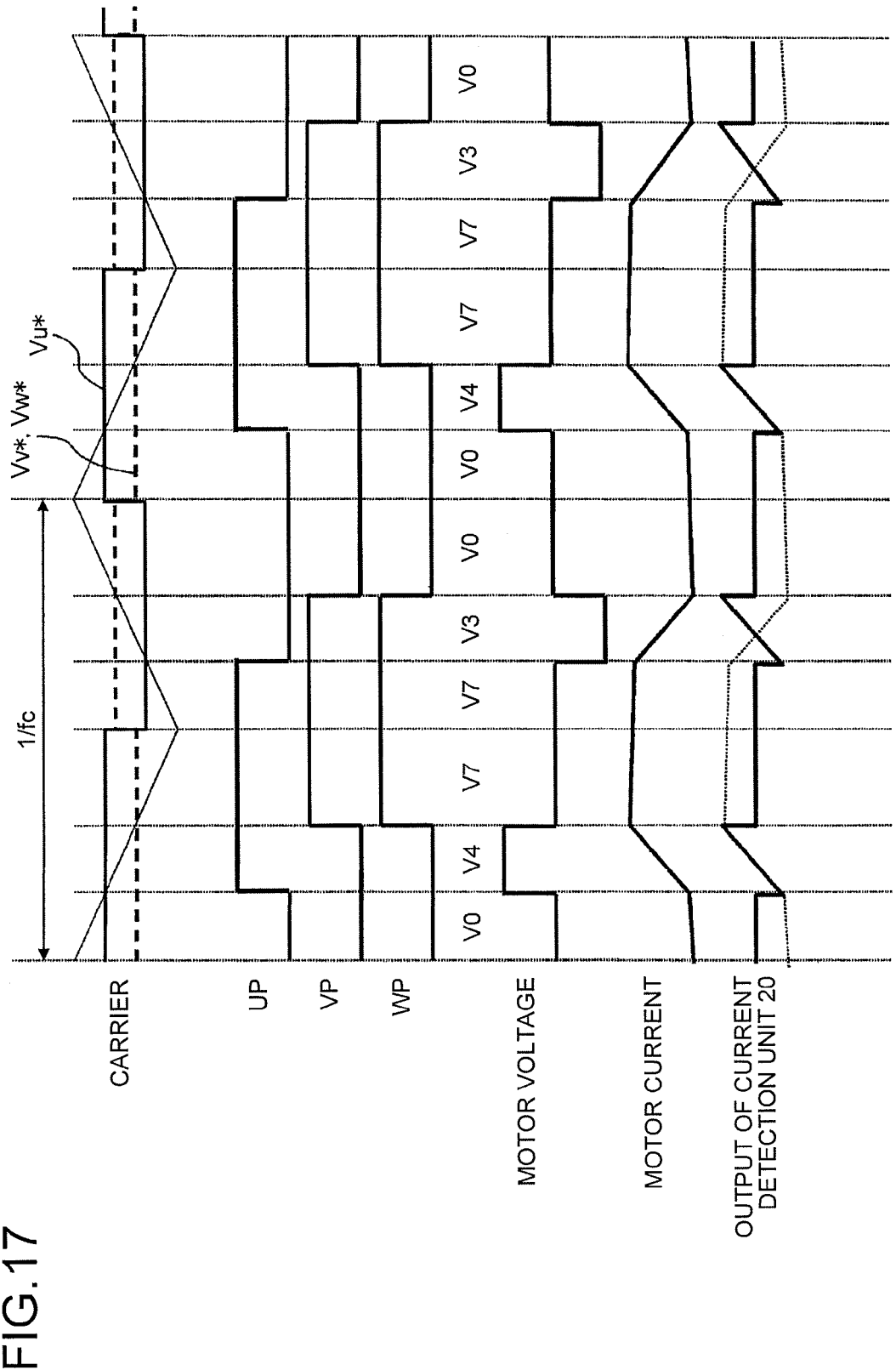
FIG. 17 is a diagram showing the voltage and the current flowing in the motor 8 and the current value detected by a current detection unit 20.

FIG. 17 is a diagram showing the voltage and the current flowing in the motor 8 and the current value detected by the current detection unit 20. In FIG. 17, the broken line shown in an overlapping manner with the current value detected by the current detection unit 20 indicates for reference the value of the current flowing in the motor 8.

Because the motor voltage becomes positive during a period of the V4 vector, the motor current flows from negative to positive. Subsequently, during a period of the V7 vector, the motor voltage becomes zero and lines of the motor 8 are short-circuited; therefore, the energy accumulated in the inductance of the motor 8 is attenuated in accordance with a time constant determined by the resistance component and the inductance component of the motor 8. Thereafter, during a period of the V3 vector, the motor voltage becomes negative; therefore, the motor current flows from positive to negative. During a period of the V0 vector, lines of the motor 8 are short-circuited again; therefore, the energy is attenuated in accordance with the time constant described above.

The time constant described above is generally around several milliseconds and is sufficiently longer than the period of 50 μsec in a case where the output frequency is 20 kHz. Therefore, during the periods of the V0 vector and the V7 vector, the current generated during the periods of the V4 vector and the V3 vector are maintained.

As described above, during the period of the V0 vector and the period of the V7 vector, the motor voltage becomes zero and lines of the motor 8 are short-circuited. Therefore, a current does not flow in the current detection unit 20. Accordingly, only during the periods of the V3 and V4 vectors does a current flow in the current detection unit 20 and the current value is detected. During periods of the V1, V2, V5, and V6 vectors in FIG. 5, a current flows in the current detection unit 20 and the current value is detected in a similar manner.

Because a winding impedance is present in a winding in a normal state, it is difficult for a large current to flow. However, for example, when lines of the motor 8 are short-circuited due to an abnormality in the winding or the like, the impedance decreases and thus a large current flows; therefore, the motor 8 and the inverter 9 may be damaged.

In the heat pump device 100 according to the third embodiment, as described above, when the comparison unit 41 determines that the current value I_fil is higher than the interruption level, the PWM interruption unit 42 interrupts the output of the PWM signals from the inverter control unit 10 to the inverter 9. Accordingly, the output of a voltage to the motor 8 from the inverter 9 is stopped and an excessive current does not flow in the motor 8 and the inverter 9; therefore, the motor 8 and the inverter 9 are prevented from being damaged.

As described above, the comparison unit 41 does not use as an input the current value I detected by the current detection unit 20 but uses as an input the current value I_fil obtained by reducing the current value having a high frequency as noise by the filter unit 40. The current value I_fil is used as an input instead of the current value I so as to prevent a malfunction due to noise.

Figure 18:
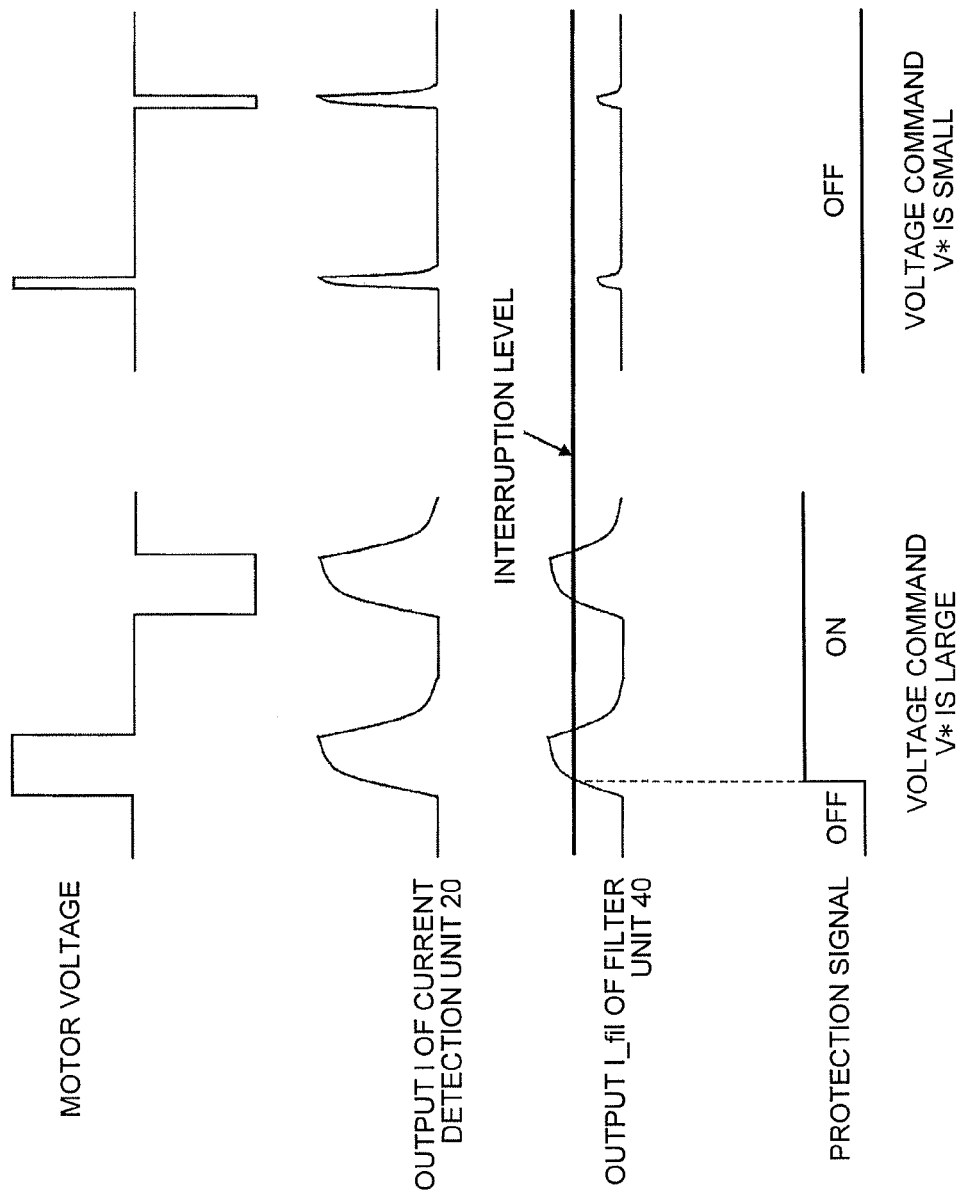
FIG. 18 is a diagram showing the relationship between a voltage command value V* and a current value I.

FIG. 18 is a diagram showing the relationship between the voltage command value V* and the current value I.

As shown in FIG. 18, when the voltage command value V* is large, the periods of the V4 vector and the V3 vector become long. Thus, the time during which a current flows in the current detection unit 20 is sufficiently secured; therefore, even if a high-frequency component of the current value I is reduced by the filter unit 40, a value sufficient to be compared with the interruption level remains as the current value I_fil. As a result, when a current exceeding the interruption level flows in the inverter 9, a protection signal is turned on and the output of the PWM signals is interrupted by the PWM interruption unit.

In contrast, when the voltage command value V* is small, the periods of the V4 vector and the V3 vector become short. Thus, the time during which a current flows in the current detection unit 20 is not sufficiently secured; therefore, when a high-frequency component of the current value I is reduced by the filter unit 40, a value sufficient to be compared with the interruption level does not remain as the current value I_fil. As a result, even when a current exceeding the interruption level flows in the inverter 9, a protection signal is not turned on and the output of the PWM signals is not interrupted by the PWM interruption unit.

In other words, when the voltage command value V* is small and the periods of the V4 vector and the V3 vector are short, the output of the PWM signals is not interrupted by the PWM interruption unit despite the fact that a current with a magnitude such that protection is needed is flowing. Therefore, voltage application from the inverter 9 to the motor 8 continues and an excessive current continues to flow to the motor 8 and the inverter 9 and thus the motor 8 and the inverter 9 may be damaged.

Figure 19:
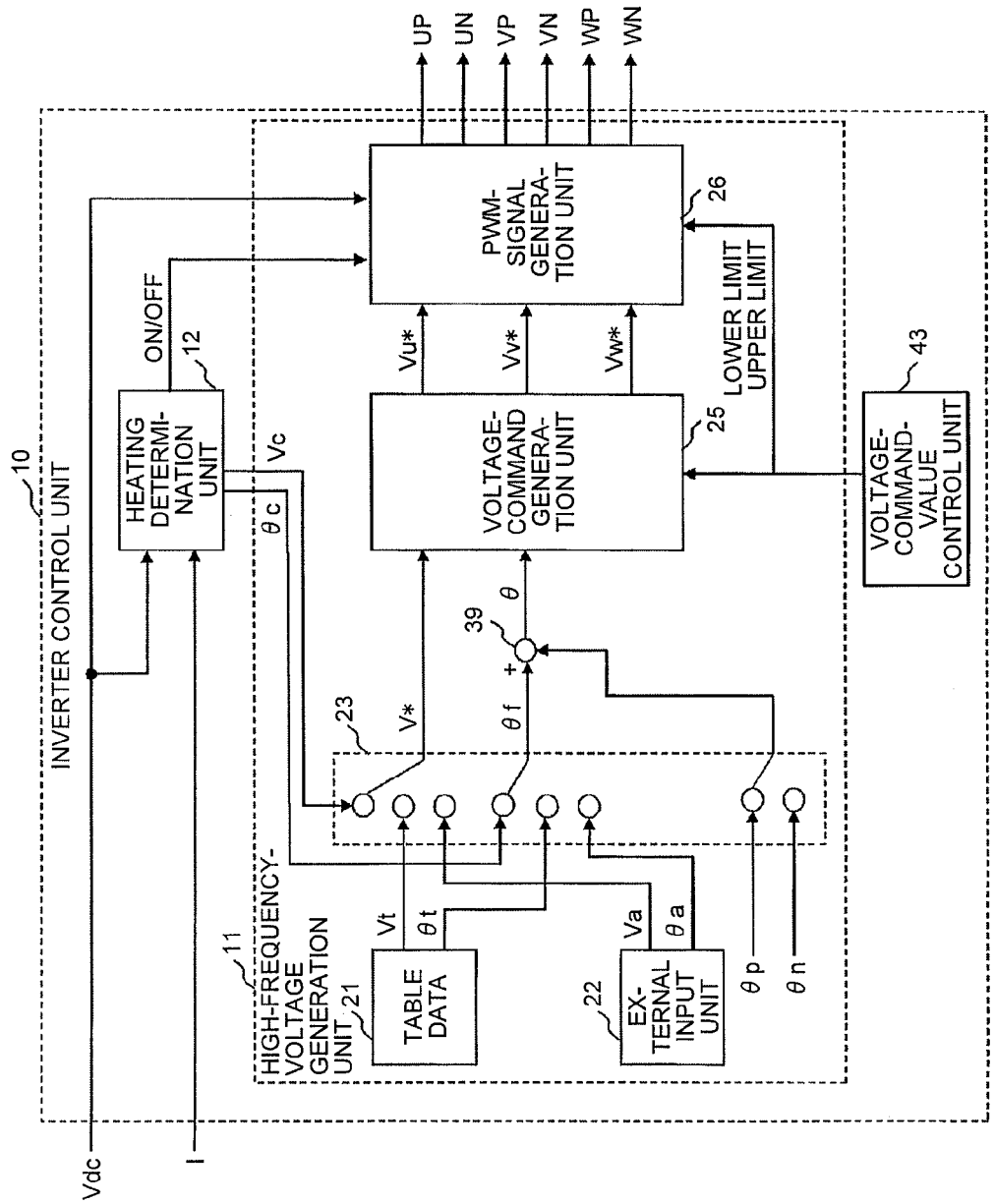
FIG. 19 is a diagram showing a configuration of the inverter control unit 10 according to a third embodiment.

FIG. 19 is a diagram showing a configuration of the inverter control unit 10 according to the third embodiment.

As shown in FIG. 19, the inverter control unit 10 is provided with a voltage-command-value control unit 43. The voltage-command-value control unit 43 sets a lower limit of the voltage command value V* (or voltage command values Vu*, Vv* and Vw*) so that the comparison unit 41 definitely determines that the current value I_fil is higher than the interruption level when a current with a magnitude such that protection is needed flows. Then, the voltage-command-value control unit 43 controls the voltage command value V* (or voltage command values Vu*, Vv* and Vw*) to be equal to or higher than the lower limit.

This lower limit is set according to the frequency that is reduced by the filter unit 40 and the setting values, such as the time constant. Moreover, the lower limit may be set also in consideration of the interruption level of the comparison unit 41. Correct setting of the lower limit enables reliable protection in various heat pump devices.

Figure 20:
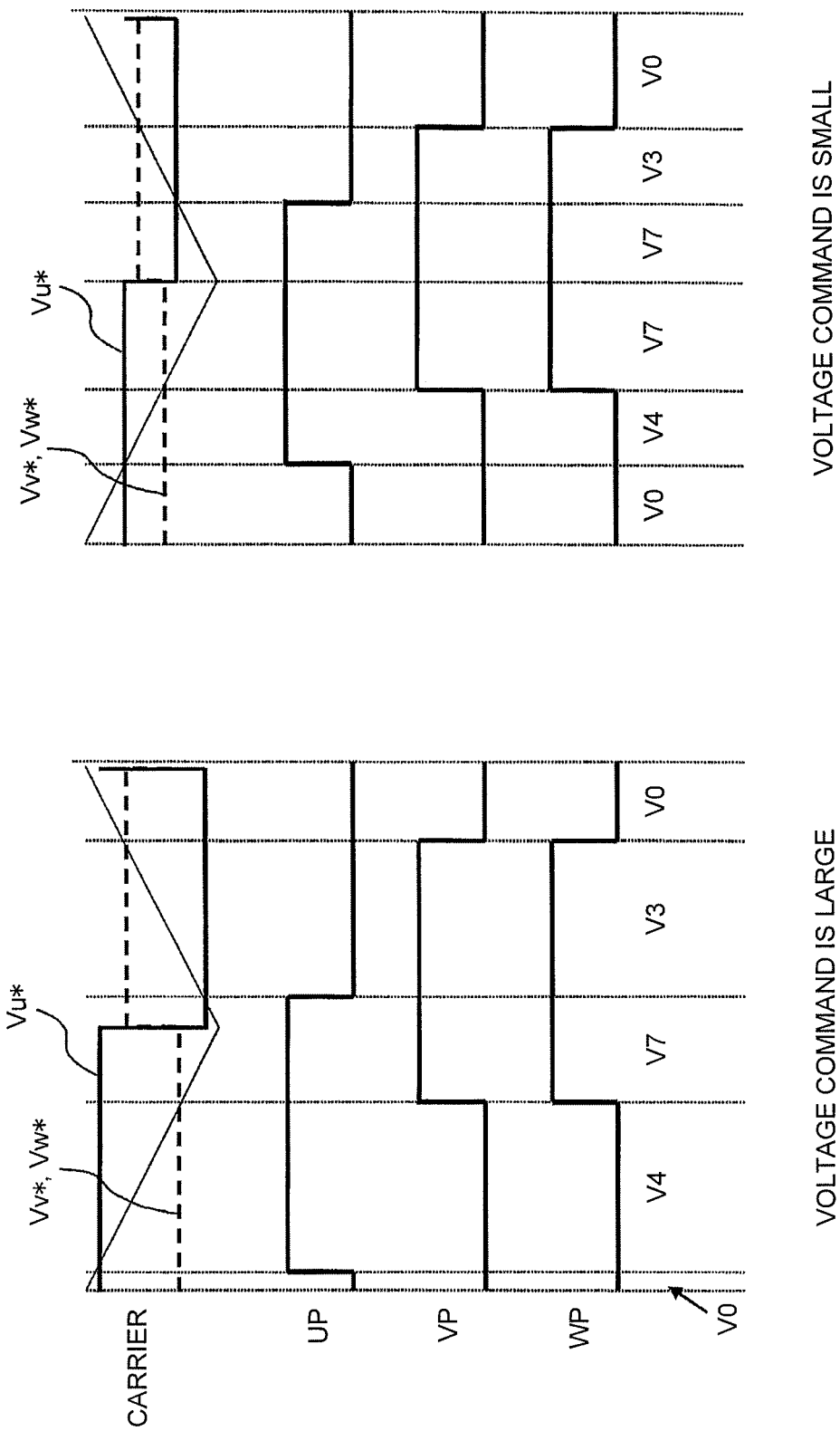
FIG. 20 is a diagram showing the relationship between a voltage command value V* and a carrier signal.

FIG. 20 is a diagram showing the relationship between the voltage command value V* and the carrier signal.

As shown in FIG. 20, when the voltage command value V* becomes extremely large, the UVW phase voltage command values Vu*, Vv* and Vw* operate near the top and bottom of the carrier signal. Typically, there are various microcomputers from which the inverter control unit 10 is configured and the operation near the top and bottom of the carrier signal differs. Therefore, depending on the microcomputer, when the voltage command values Vu*, Vv* and Vw* operate near the top and bottom of the carrier signal, for example, the output voltage may be reduced or an unexpected PWM signal may be output and the inverter 9 may be damaged.

Accordingly, the voltage-command-value control unit 43 sets an upper limit of the voltage command value V* (or voltage command values Vu*, Vv* and Vw*) so that the voltage command values Vu*, Vv* and Vw* does not operate near the top and bottom of the carrier signal. This upper limit can be set depending on the microcomputer used as the inverter control unit 10. For example, the upper limit is set such that the voltage command values Vu*, Vv* and Vw* are separated from the values of the top and bottom of the carrier signal (i.e., an amplitude value Vdc of the carrier signal/2) by a predetermined value or more.

As shown in FIG. 5, two switching elements (17*a* and 17*d*, 17*b* and 17*e*, or 17*c* and 17*f*) of each series connection portion in the inverter 9 operate such that when one of them is on, the other is off.

However, due to the delay of the switching operation or the like, two switching elements of the series connection portion are in an on state at the same time and are short-circuited, thereby damaging the inverter 9 in some cases. Therefore, typically, in the inverter 9, a dead time (short-circuit prevention time) is often provided from when one of the switching element 17 in the series connection portion is turned off to when the other switching element is turned on.

Figure 21:
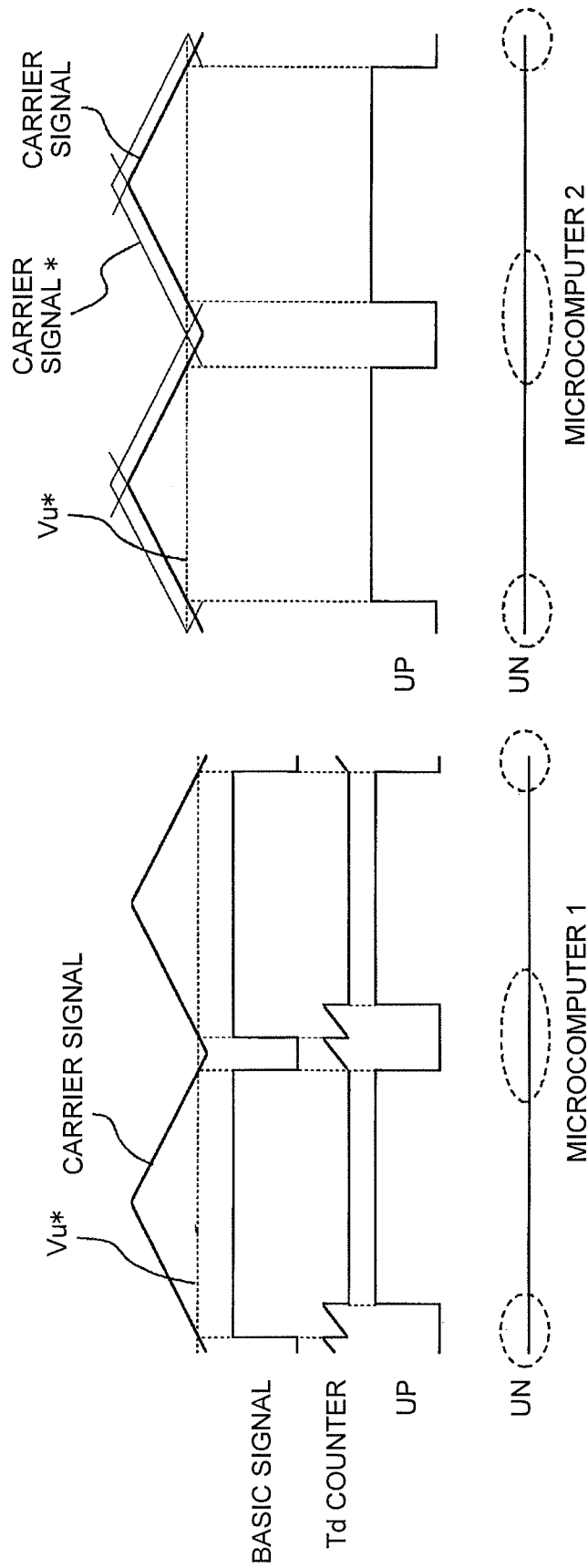
FIG. 21 is a diagram showing the relationship between a dead time and PWM signals.

FIG. 21 is a diagram showing the relationship between the dead time and the PWM signals. FIG. 21 illustrates two examples, i.e., with a microcomputer 1 and a microcomputer 2.

In the case of the microcomputer 1, as a result of the comparison between the carrier signal and the voltage command value Vu*, when the carrier signal is higher than the voltage command value Vu*, the basic signal becomes high, and when the carrier signal is lower than the voltage command value Vu*, the basic signal becomes low. Then, when the basic signal is high, the PWM signal UP is turned on and the PWM signal UN is turned off. When the basic signal is low, the PWM signal UN is turned on and the PWM signal UP is turned off. However, the PWM signal is not switched during the dead time (one count of the Td counter) after the basic signal is switched. Therefore, in the example in FIG. 21, the PWM signal UN is not turned on at the timings (periods surrounded by the broken lines in FIG. 21) at which the PWN signal UN would otherwise be turned on.

In the case of the microcomputer 2, as a result of the comparison between the carrier signal and the voltage command value Vu*, when the carrier signal is higher than the voltage command value Vu*, the PWM signal UP is turned on, and when the carrier signal is lower than the voltage command value Vu*, the PWM signal UP is turned off. Moreover, as a result of the comparison between a carrier signal* obtained by shifting the carrier signal upward and the voltage command value Vu*, when the carrier signal* is higher than the voltage command value Vu*, the PWM signal UN is turned off, and when the carrier signal* is lower than the voltage command value Vu*, the PWM signal UN is turned on. In the case of the microcomputer 2, due to the shift between the carrier signal and the carrier signal*, the dead time is set. In the example in FIG. 21, the PWM signal UN is not turned on at the timings (periods surrounded by the broken lines in FIG. 21) at which the PWN signal UN would otherwise be turned on.

As described above, in the case where the dead time is provided, when the voltage command values Vu*, Vv* and Vw* operate near the top and bottom of the carrier signal, the PWM signal that turns one of the switching elements 17 on is reduced and the PWM signals corresponding to two switching elements do not operate such that they have an inverse relationship to each other.

Accordingly, the voltage-command-value control unit 43 sets the upper limit of the voltage command value V* (or voltage command values Vu*, Vv* and Vw*) so that the voltage command values Vu*, Vv* and Vw* do not operate near the top and bottom of the carrier signal also in consideration of the dead time. For example, the upper limit is set such that the voltage command values Vu*, Vv* and Vw* are separated from the values of the top and bottom of the carrier signal (i.e., an amplitude value Vdc of the carrier signal/2) by equal to or more than a predetermined value that is calculated from the dead time.

As described above, in the heat pump device 100 according to the third embodiment, the lower limit and the upper limit are set for the voltage command value Vu*; therefore, even when a high-frequency voltage is applied to the motor 8, the motor 8 and the inverter 9 can be prevented from being damaged.

In the above explanation, any one of the voltage command value Vu* and the voltage command values Vu*, Vv* and Vw* is limited. When the voltage command value Vu* is limited, the voltage command values Vu*, Vv* and Vw* are limited as a result. Thus, the same effect is obtained regardless of which one of them is limited.

Fourth Embodiment

In a fourth embodiment, one example of a circuit configuration of the heat pump device 100 is explained.

For example, in FIG. 1 and the like, there is shown the heat pump device 100 in which the compressor 1, the four-way valve 2, the heat exchanger 3, the expansion mechanism 4 and the heat exchanger 5 are sequentially connected by the piping. In the fourth embodiment, the heat pump device 100 having a more specific configuration is explained.

Figure 22:
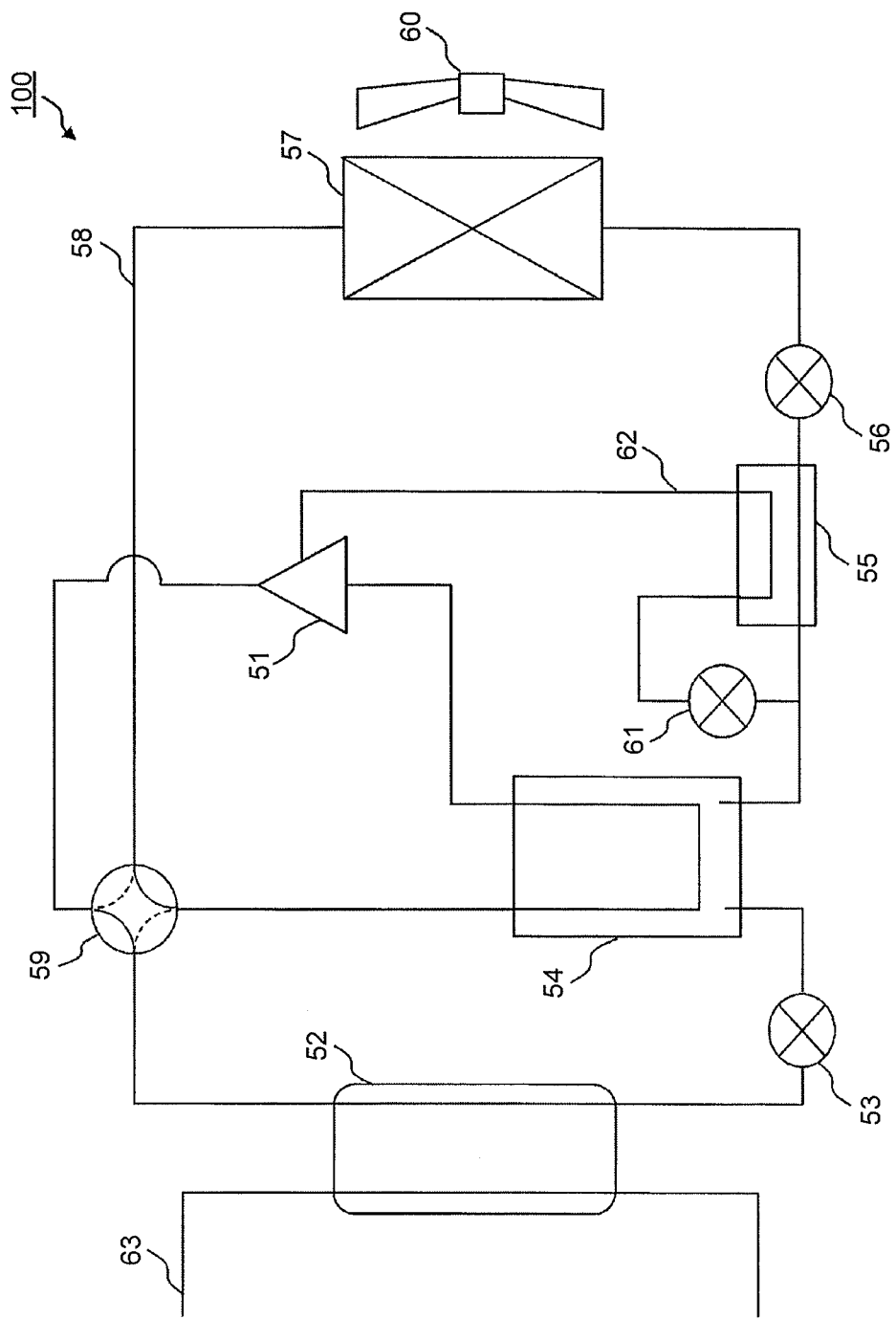
FIG. 22 is a circuit configuration diagram of the heat pump device 100 according to a fourth embodiment.

FIG. 22 is a circuit configuration diagram of the heat pump device 100 according to the fourth embodiment.

FIG. 23 is a Mollier diagram of a state of the refrigerant of the heat pump device 100 shown in FIG. 22. In FIG. 23, a specific enthalpy is indicated on a horizontal axis, and a refrigerant pressure is indicated on a vertical axis.

In the heat pump device 100, a compressor 51, a heat exchanger 52, an expansion mechanism 53, a receiver 54, an internal heat exchanger 55, an expansion mechanism 56, and a heat exchanger 57 are sequentially connected by piping, and the heat pump device 100 includes a main refrigerant circuit 58 through which the refrigerant circulates. In the main refrigerant circuit 58, a four-way valve 59 is provided on a discharge side of the compressor 51, so that a circulation direction of the refrigerant can be switched. A fan 60 is provided near the heat exchanger 57. The compressor 51 is the compressor 1 explained in the embodiment described above, and includes the motor 8 driven by the inverter 9 and the compression mechanism 7.

Furthermore, the heat pump device 100 includes an injection circuit 62 that connects from between the receiver 54 and the internal heat exchanger 55 to an injection pipe of the compressor 51 by the piping. An expansion mechanism 61 and the internal heat exchanger 55 are sequentially connected to the injection circuit 62.

A water circuit 63 in which water is circulated is connected to the heat exchanger 52. A device that uses water from a hot water dispenser, a radiator, a radiator for floor heating, or the like is connected to the water circuit 63.

An operation of the heat pump device 100 at the time of a heating operation is explained first. At the time of the heating operation, the four-way valve 59 is set in a direction of a solid line. The heating operation includes not only heating used for air conditioning but also hot-water supply for applying heat to water to make hot water.

A gas-phase refrigerant (at a point 1 in FIG. 23), which has become a refrigerant having a high temperature and a high pressure in the compressor 51, is discharged from the compressor 51, and heat exchanged by the heat exchanger 52, which is a condenser and a radiator, to be liquefied (at a point 2 in FIG. 23). At this time, water circulating in the water circuit 63 is heated by heat radiated from the refrigerant, and used for heating and hot-water supply.

The liquid-phase refrigerant liquefied by the heat exchanger 52 is pressure-reduced by the expansion mechanism 53, and becomes a gas-liquid two-phase state (at a point 3 in FIG. 23). The refrigerant, which has become the gas-liquid two-phase state in the expansion mechanism 53, is heat exchanged with the refrigerant sucked into the compressor 51 by the receiver 54, and is cooled and liquefied (at a point 4 in FIG. 23). The liquid-phase refrigerant liquefied by the receiver 54 is branched to the main refrigerant circuit 58 and the injection circuit 62 to flow therein.

The liquid-phase refrigerant flowing in the main refrigerant circuit 58 is heat exchanged with the refrigerant flowing in the injection circuit 62, which is pressure-reduced by the expansion mechanism 61 and has become the gas-liquid two-phase state, by the internal heat exchanger 55 and is further cooled (at a point 5 in FIG. 23). The liquid-phase refrigerant cooled by the internal heat exchanger 55 is pressure-reduced by the expansion mechanism 56 and becomes the gas-liquid two-phase state (at a point 6 in FIG. 23). The refrigerant, which has become the gas-liquid two-phase state in the expansion mechanism 56, is heat exchanged with ambient air by the heat exchanger 57, which is an evaporator, and is heated (at a point 7 in FIG. 23). The refrigerant heated by the heat exchanger 57 is further heated by the receiver 54 (at a point 8 in FIG. 23), and is sucked into the compressor 51.

On the other hand, as described above, the refrigerant flowing in the injection circuit 62 is pressure-reduced by the expansion mechanism 61 (at a point 9 in FIG. 23), and heat exchanged by the internal heat exchanger 55 (at a point 10 in FIG. 23). A refrigerant (injection refrigerant) in the gas-liquid two-phase state, which has been subjected to thermal exchange by the internal heat exchanger 55, flows into inside of the compressor 51 from the injection pipe of the compressor 51 keeping in the gas-liquid two-phase state.

In the compressor 51, the refrigerant sucked in from the main refrigerant circuit 58 (at the point 8 in FIG. 23) is compressed up to an intermediate pressure and heated (at a point 11 in FIG. 23). The injection refrigerant (at the point 10 in FIG. 23) joins the refrigerant compressed to the intermediate pressure and heated (at the point 11 in FIG. 23), thereby decreasing the temperature (at a point 12 in FIG. 23). The refrigerant having the decreased temperature (at the point 12 in FIG. 23) is further compressed and heated to have a high temperature and a high pressure, and is discharged (at the point 1 in FIG. 23).

When the injection operation is not performed, an aperture of the expansion mechanism 61 is fully closed. That is, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51.

The aperture of the expansion mechanism 61 here is controlled by electronic control by a control unit such as a microcomputer.

The operation of the heat pump device 100 at the time of a cooling operation is explained next. At the time of the cooling operation, the four-way valve 59 is set in a direction of a broken line. The cooling operation includes not only cooling used for air conditioning, but also drawing heat from water to make cold water, refrigeration, and the like.

The gas-phase refrigerant, which has become a refrigerant having a high temperature and a high pressure in the compressor 51 (at the point 1 in FIG. 23), is discharged from the compressor 51, and is heat exchanged by the heat exchanger 57, which functions as the condenser and the radiator, to be liquefied (at the point 2 in FIG. 23). The liquid-phase refrigerant liquefied by the heat exchanger 57 is pressure-reduced by the expansion mechanism 56, and becomes a gas-liquid two-phase state (at the point 3 in FIG. 23). The refrigerant, which has become the gas-liquid two-phase state in the expansion mechanism 56, is heat exchanged by the internal heat exchanger 55, and is cooled and liquefied (at the point 4 in FIG. 23). In the internal heat exchanger 55, the refrigerant, which has become the gas-liquid two-phase state in the expansion mechanism 56, is heat exchanged with the refrigerant (the point 9 in FIG. 23), which has become the gas-liquid two-phase state by pressure-reducing the liquid-phase refrigerant liquefied by the internal heat exchanger 55, by the expansion mechanism 56. The liquid-phase refrigerant (the point 4 in FIG. 23) heat exchanged by the internal heat exchanger 55 is branched to the main refrigerant circuit 58 and the injection circuit 62 to flow therein.

The liquid-phase refrigerant flowing in the main refrigerant circuit 58 is then heat exchanged with the refrigerant sucked into the compressor 51 by the receiver 54, and is further cooled (at the point 5 in FIG. 23). The liquid-phase refrigerant cooled by the receiver 54 is pressure-reduced by the expansion mechanism 53 and becomes the gas-liquid two-phase state (at the point 6 in FIG. 23). The refrigerant, which has become the gas-liquid two-phase state in the expansion mechanism 53, is heat exchanged by the heat exchanger 52, which functions as the evaporator, and is heated (at the point 7 in FIG. 23). At this time, because the refrigerant absorbs heat, water circulating in the water circuit 63 is cooled and used for cooling and refrigeration.

The refrigerant heated by the heat exchanger 52 is further heated by the receiver 54 (at the point 8 in FIG. 23), and is sucked into the compressor 51.

On the other hand, the refrigerant flowing in the injection circuit 62 is pressure-reduced by the expansion mechanism 61 (at the point 9 in FIG. 23) as described above, and heat exchanged by the internal heat exchanger 55 (at the point 10 in FIG. 23). A refrigerant (injection refrigerant) in the gas-liquid two-phase state, which has been heat exchanged by the internal heat exchanger 55, flows into the compressor 51 from the injection pipe of the compressor 51 keeping in the gas-liquid two-phase state.

The compression operation in the compressor 51 is the same as that of the heating operation.

When the injection operation is not performed, as in the heating operation, the aperture of the expansion mechanism 61 is fully closed, so as not to result in the refrigerant flowing into the injection pipe of the compressor 51.

In the above explanations, the heat exchanger 52 has been explained as a heat exchanger like a plate type heat exchanger that performs heat exchange between the refrigerant and water circulating in the water circuit 63. However, the heat exchanger 52 is not limited thereto, and may be other types of heat exchangers that perform heat exchange between a refrigerant and air.

The water circuit 63 may not be a circuit in which water is circulated, but may be a circuit in which another type of fluid is circulated.

As described above, the heat pump device 100 can be used for a heat pump device using an inverter compressor, such as an air conditioner, a heat pump water heater, a refrigerator, a freezer, and the like.

The invention claimed is:

1. A heat pump device comprising:
a compressor including a compression mechanism that compresses a refrigerant;
a motor that actuates the compression mechanism of the compressor;
an inverter that applies a voltage to the motor;
an inverter control unit that controls the inverter by outputting a drive signal to the inverter; and
a current detection unit that detects a current value flowing in the inverter and includes a filter unit that reduces a component having a predetermined first frequency or higher in the detected current value, wherein
when a current value after reducing the component having the first frequency or higher from the detected current value is equal to or larger than a predetermined current value, an output of a drive signal from the inverter control unit to the inverter is stopped,
the inverter control unit comprises
a voltage-command generation unit that generates and outputs a voltage command value, and a value of a voltage command value is controlled such that a voltage command value generated by the voltage-command generation unit becomes a value that is equal to or larger than a lower limit determined according to the first frequency.

2. The heat pump device according to claim 1, wherein
the inverter control unit further comprises a phase switching unit that switches and outputs a phase in synchronization with a reference signal having a predetermined second frequency,
the voltage-command generation unit generates the voltage command value by using a phase output from the phase switching unit and an amplitude value V*, and
the inverter control unit controls the voltage command value to be equal to or larger than the lower limit by controlling the amplitude value V* to be equal to or larger than a first value determined according to the first frequency.

3. The heat pump device according to claim 1, wherein the inverter control unit controls the value of the voltage command value such that the voltage command value generated by the voltage-command generation unit becomes a value that is equal to or smaller than an upper limit determined according to an amplitude value of a reference signal having a predetermined second frequency.

4. A heat pump device comprising:
a compressor including a compression mechanism that compresses a refrigerant;
a motor that actuates the compression mechanism of the compressor;
an inverter that applies a voltage to the motor; and
an inverter control unit that controls the inverter by outputting a drive signal to the inverter, wherein
a current value flowing in the inverter is detected and a component having a predetermined first frequency or higher in detected current value is reduced,
when the component having the first frequency or higher is equal to or larger than a predetermined current value, an output of a drive signal from the inverter control unit to the inverter is stopped,
the inverter control unit comprises
a voltage-command generation unit that generates and outputs a voltage command value, and a value of the voltage command value is controlled such that the voltage command value generated by the voltage-command generation unit becomes a value that is equal to or larger than a lower limit determined according to the first frequency,
wherein the inverter control unit controls the value of the voltage command value such that the voltage command value generated by the voltage-command generation unit becomes a value that is equal to or smaller than an upper limit determined according to an amplitude value of a reference signal having a predetermined second frequency,
wherein the inverter control unit further comprises a phase switching unit that switches and outputs a voltage phase for generating the voltage command in synchronization with the reference signal,
the voltage-command generation unit generates the voltage command value by using a phase output from the phase switching unit and an amplitude value V*, and
the inverter control unit controls the voltage command value to be equal to or smaller than the upper limit by controlling the amplitude value V* to be equal to or smaller than a second value determined according to an amplitude value of the reference signal.

5. The heat pump device according to claim 4, wherein
the inverter includes a series connection portion in which two switching elements are connected in series, and does not turn on one of the two switching elements of the series connection portion until a predetermined short-circuit prevention time elapses after another of the two switching elements is turned off, and
the inverter control unit controls the amplitude value V* to be equal to or smaller than the second value determined according to the amplitude value of the reference signal and the short-circuit prevention time.

6. The heat pump device according to claim 2, wherein
the reference signal is a signal whose top and bottom are capable of being identified, and
the phase switching unit switches the phase at timings of a top and a bottom of the reference signal.

7. The heat pump device according to claim 4, wherein the phase switching unit switches and outputs the phase in synchronization with the reference signal, while changing a phase angle of a phase to be switched for each predetermined time.

8. The heat pump device according to claim 1, wherein
the inverter control unit further comprises a heating determination unit that determines whether to perform a heating operation of heating the compressor while a compressing operation of causing the compressor to compress a refrigerant is stopped, and
when the heating determination unit determines that a heating operation is performed, the inverter control unit causes the inverter to generate a high-frequency AC voltage having a frequency higher than an AC voltage generated by the inverter during the compressing operation by outputting each drive signal to the inverter.

9. The heat pump device according to claim 1, wherein a switching element that constitutes the inverter is made from a wide bandgap semiconductor.

10. The heat pump device according to claim 9, wherein the wide bandgap semiconductor is made from SiC, GaN, or diamond.

11. The heat pump device according to claim 1, wherein a switching element that constitutes the inverter is a MOSFET having a super junction structure.

* * * * *